(12) United States Patent
Katsunoi et al.

(10) Patent No.: US 8,305,638 B2
(45) Date of Patent: Nov. 6, 2012

(54) IMAGE PROCESSING APPARATUS HAVING PLURAL DETACHABLE IMAGE PROCESSING UNITS FOR IMAGE PROCESSING TASKS

(75) Inventors: Ichiroh Katsunoi, Tokyo (JP); Tatsuya Kuranaga, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 583 days.

(21) Appl. No.: 12/457,538

(22) Filed: Jun. 15, 2009

(65) Prior Publication Data

US 2009/0316169 A1     Dec. 24, 2009

(30) Foreign Application Priority Data

Jun. 18, 2008  (JP) .................................. 2008-158788
Jul. 17, 2008   (JP) .................................. 2008-185513
Apr. 13, 2009  (JP) .................................. 2009-097121

(51) Int. Cl.
   *G03F 3/08*    (2006.01)
   *G06K 9/00*    (2006.01)

(52) U.S. Cl. ......... 358/1.9; 358/519; 358/520; 358/521; 382/166; 382/167

(58) Field of Classification Search ........................ None
See application file for complete search history.

(56) References Cited

U.S. PATENT DOCUMENTS

| 2001/0035983 | A1* | 11/2001 | Abe .............................. 358/468 |
| 2003/0123092 | A1* | 7/2003 | Toda ............................. 358/2.1 |
| 2004/0081901 | A1 | 4/2004 | Egusa et al. | |
| 2004/0125400 | A1 | 7/2004 | De Graaff et al. | |
| 2004/0156076 | A1* | 8/2004 | Togami et al. ................. 358/2.1 |
| 2005/0280865 | A1* | 12/2005 | Oteki ............................. 358/2.1 |
| 2008/0043291 | A1* | 2/2008 | Togami et al. ................. 358/474 |
| 2010/0149554 | A1 | 6/2010 | De Graaff et al. | |

FOREIGN PATENT DOCUMENTS

| JP | 03-234598 | 10/1991 |
| JP | 09/160860 | 6/1997 |
| JP | 11-286191 | 10/1999 |
| JP | 2004-40784 | 2/2004 |
| JP | 2004-133413 | 4/2004 |
| JP | 2006-203702 | 8/2006 |
| JP | 2006-325260 | 11/2006 |

OTHER PUBLICATIONS

Office Action mailed Aug. 31, 2010 issued for corresponding Japanese Application No. 2009-097121.
Office Action mailed Jun. 1, 2010 issued for corresponding Japanese Application No. 2009-197121.
Office Action dated Jul. 22, 2010 for corresponding Japanese Application No. 2006-196028.
Office Action mailed Jun. 1, 2010 issued for corresponding Japanese Application No. 2009-097121.

* cited by examiner

*Primary Examiner* — Benny Q Tieu
*Assistant Examiner* — Haris Sabah
(74) *Attorney, Agent, or Firm* — Harness, Dickey & Pierce, P.L.C.

(57) ABSTRACT

A controller unit controls an image processing apparatus that includes a scanner unit that acquires image data by scanning an original. The controller unit includes a scanning characteristic correcting unit that converts the image data acquired by the scanner unit into normalized image data, an expanded I/F unit to which a controller image processing unit can be detachably attached to perform an image reducing operation on the normalized image data, and a basic image processing unit that, when the controller image processing unit is not attached to the expanded I/F unit, performs a basic image reducing operation on the normalized image data.

16 Claims, 15 Drawing Sheets

INPUT DATA

64 BITS (8-BIT PIXEL SEQUENTIAL IMAGE DATA OF EACH COMPONENT OF RGB)

OUTPUT DATA

64 BITS (8-BIT PIXEL SEQUENTIAL IMAGE DATA OF EACH COMPONENT OF RGBZ)

IMAGE PROCESSING APPARATUS HAVING PLURAL DETACHABLE IMAGE PROCESSING UNITS FOR IMAGE PROCESSING TASKS

CROSS-REFERENCE TO RELATED APPLICATIONS

The present application claims priority to and incorporates by reference the entire contents of Japanese priority document 2008-158788 filed in Japan on Jun. 18, 2008, Japanese priority document 2008-185513 filed in Japan on Jul. 17, 2008 and Japanese priority document 2009-097121 filed in Japan on Apr. 13, 2009.

BACKGROUND OF THE INVENTION

1. Field of the Invention

The present invention relates to a technology of controlling operations of an image forming apparatus (image processing apparatus) that includes a scanner unit that acquires image data by scanning an original.

2. Description of the Related Art

Presently, with the expansion in applications of multifunction products (MFPs), which are image forming apparatuses capable of performing various functions such as copying, printing, and facsimileing, there is an extensive demand for both sophisticated high-speed configurations and basic low-cost configurations.

Generally, manufacturing a low-cost MFP at low developing cost and enhancing the processing speed thereof are conditions of contradictory nature and it is difficult to fulfill both the conditions at the same time.

In recent years, there is a demand for a series of different configurations, from small-scale configurations to large-scale configurations, of the same model of an MFP. However, as an MFP performs scanner processing, image processing, and output processing as necessary functions, adhering to sophisticated specifications results in increasing the manufacturing cost of low-cost configurations.

On the other hand, if the sophisticated configurations and the basic configurations are manufactured in an independent manner for cost optimization, then it becomes difficult to provide the sought-after extensibility in present-day MFPs.

Japanese Patent Application Laid-open No. 2006-325260 discloses a technique for manufacturing a high-speed MFP at low cost. In that technique, an image processing unit for scanning and storing purpose is added on to an image processing unit for plotting purpose and the image data read from an original is temporarily stored by using the storing operation.

With the use of such a conventional technique, a printer can be extended to function as an MFP. However, since the technique corresponds to a sophisticated configuration that allows storing of image data, it cannot be implemented as it is to a basic low-cost configuration that does not have a storing function. The reason for that lays in the fact it is not sufficient to just remove the mechanism of controlling the storing operation for a basic configuration not having the storing function. For example, if a color determining operation in which an image in RGB color space is stored on a temporary basis before being converted in monochromatic data is to be implemented when the storing function is not available, then it is necessary to substantially alter the image processing sequence thereby making it difficult to standardize other functions.

SUMMARY OF THE INVENTION

It is an object of the present invention to at least partially solve the problems in the conventional technology.

According to an aspect of the present invention, there is provided a controller unit that controls an image processing apparatus that includes a scanner unit configured to acquire image data by scanning an original. The controller unit includes a scanning characteristic correcting unit that converts the image data into normalized image data; an attaching unit to which a controller image processing unit can be detachably attached as a first image processing unit, the controller image processing unit when attached to the attaching unit perform a first image processing operation on the normalized image data; and a basic image processing unit that functions as a second image processing unit and that, when the controller image processing unit is not attached to the attaching unit, performs a second image processing operation on the normalized image data as a substitute for the first image processing operation.

According to another aspect of the present invention, there is provided a control method of controlling performed by a controller unit with respect to an image processing apparatus that includes a scanner unit configured to acquire image data by scanning an original. The controller unit includes an attaching unit to which a controller image processing unit is detachably attached to perform a first image processing operation on the image data read by the scanner unit. The control method includes converting the image data into normalized image data by a scanner image processing unit; and performing a second image processing operation, when the controller image processing unit is not attached to the attaching unit, on the normalized image data by a basic image processing unit as a substitute for the first image processing operation.

According to still another aspect of the present invention, there is provided a controller unit that controls an image processing apparatus that includes a scanner unit configured to acquire image data by scanning an original. The controller unit includes a correcting means for converting the image data into normalized image data; an attaching means for attaching a controller image processing unit in a detachable manner as a first image processing unit, the controller image processing unit when attached to the attaching means perform a first image processing operation on the normalized image data; and a processing means for functioning as a second image processing unit and that, when the controller image processing unit is not attached to the attaching means, performs a second image processing operation on the normalized image data as a substitute for the first image processing operation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
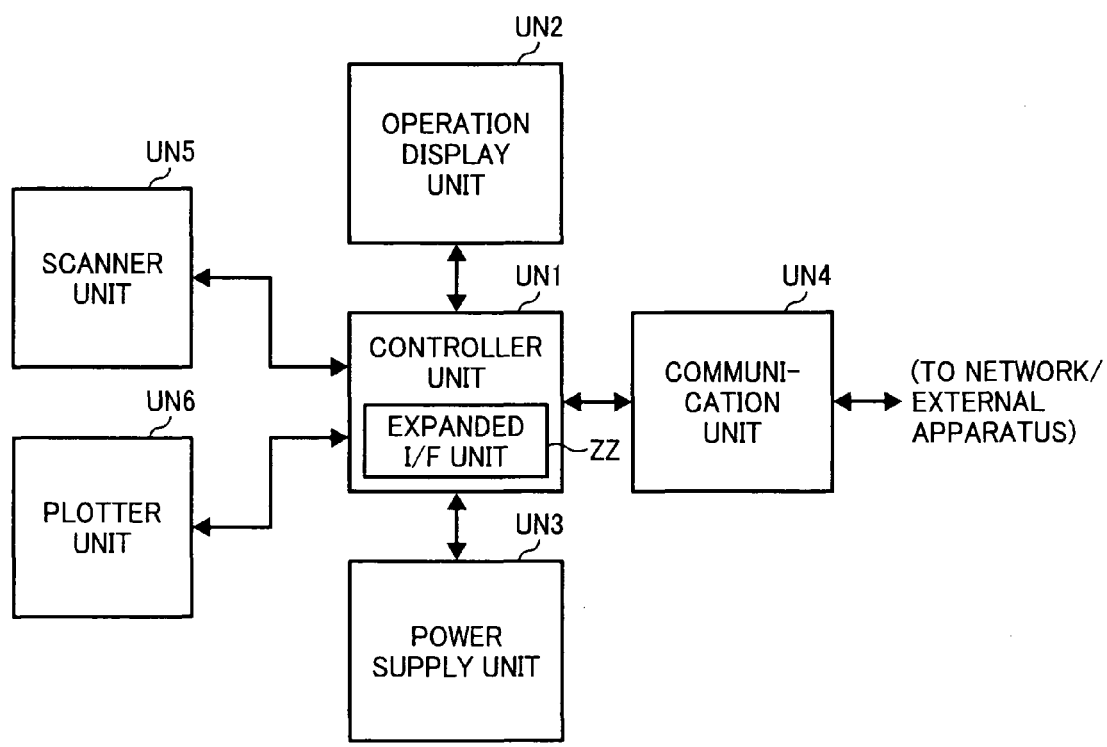
FIG. 1 is a schematic diagram of an exemplary image forming apparatus (image processing apparatus) according to a first embodiment of the present invention.

FIG. 1 is a schematic diagram of an exemplary image forming apparatus (image processing apparatus) according to a first embodiment of the present invention.

The image forming apparatus includes a controller unit UN1 that controls the operations of other constituent elements, an operation display unit UN2 that functions as a user I/F thereby allowing the user to operate the image forming apparatus, a power supply unit UN3 that supplies power to the other constituent elements, a communication unit UN4 that is connected to an external apparatus or a network and that communicates a variety of information with the external apparatus or with another terminal device(s) via the network, a scanner unit UN5 that scans an original (original image) and generates image data, and a plotter unit UN6 that prints an image on a recording medium such as a sheet of paper.

The scanner unit UN5 and the plotter unit UN6 are detachably attached to the image forming apparatus. Moreover, by following certain I/F specifications (e.g., I/F specifications regarding physical characteristics or signal input-output conditions), it is possible to attach various types of the scanner unit UN5 and the plotter unit UN6 to the image forming apparatus. For example, the scanner unit UN5 can be a scanner unit equipped with an automatic document feeder (ADF), a scanner unit equipped with a monochromatic reading mechanism, or a scanner unit equipped with a color reading mechanism. The plotter unit UN4 can be a plotter unit equipped with a finishing function (sorting, stapling, folding, etc.), a plotter unit equipped with a monochromatic printing mechanism, or a plotter unit equipped with a color printing mechanism.

The communication unit UN4 can also be selected from a plurality of types. For example, the communication unit UN4 can be a communication unit equipped with a host interface that connects with a host apparatus such as a personal computer (PC) and a network I/F that connects with a network or a communication unit equipped with only a host interface. Moreover, for a stand-alone configuration of the image forming apparatus (e.g., a copier), there are times when the communication unit UN4 is not attached at all.

When both the scanner unit UN5 and the plotter unit UN6 are attached, the image forming apparatus can perform functions of copying, printing, network printing, facsimileing, network facsimileing, scanning, and network scanning. Depending on those functions, a suitable type of the communication unit UN4 can be attached to the image forming apparatus.

When only the plotter unit UN6 is attached, the image forming apparatus can perform functions of printing and network printing. Thus, depending on those functions, a suitable type of the communication unit UN4 can be attached to the image forming apparatus.

The controller unit UN1 includes an expanded I/F unit ZZ to which an expansion board can be attached. When an expansion board is attached to the expanded I/F unit ZZ, the image forming apparatus is able to perform image processing with the use of the functions installed on the expansion board. In the first embodiment it is assumed that an expansion board equipped with a controller image processing unit is attached to the expanded I/F unit ZZ.

To start the copying mode (copying application) of the image forming apparatus, the user first sets an original to be copied in the scanner unit UN5 and instructs the image forming apparatus to perform the copying operation by pressing, for example, a start key (not shown). In response to the user instruction, the scanner unit UN5 starts reading an original image from the set original. Subsequently, a preview image, which is a reduced-size image of the copy image, is displayed on a display screen (not shown) of the operation display unit UN2. For example, the displayed preview image is reduced to about one-fourth the size of the copy image.

The preview image gives the user an idea of how the final copied output looks like. Depending on that, the user determines whether to continue with the copying operation and gives instructions accordingly. For an instruction to continue the copying operation, the scanner unit UN5 sends the generated image data to the plotter unit UN6 for printing.

Thus, in the copying mode, it is necessary to generate image data to be sent to the plotter unit UN6 for printing and image data of reduced size for user preview (hereinafter, "preview image data") to be displayed on the operation display unit UN2. Particularly, because the user needs to confirm the preview image before determining on continuing the copying operation, it is necessary to generate the preview image data in short time.

In a similar manner to the copying mode, to start the facsimileing mode (facsimileing application) or the network facsimileing mode (network facsimileing application) of the image forming apparatus, the user first sets an original to be facsimiled in the scanner unit UN5 and instructs the image forming apparatus to perform the facsimileing operation by pressing, for example, a start key (not shown). In response to the user instruction, the scanner unit UN5 starts reading an original image from the set original. Subsequently, a preview image that is a reduced-size image of the original image to be facsimiled is displayed on a display screen (not shown) of the operation display unit UN2.

The preview image gives the user an idea of how the final facsimiled output looks like. Depending on that, the user determines whether to continue with the facsimileing operation and gives instructions accordingly. For an instruction to continue the facsimileing operation, the scanner unit UN5 sends the generated image data to the communication unit UN4 and the communication unit UN4 in turn sends the image data to the intended destination by facsimile communication (or network facsimile communication).

Thus, in the facsimileing mode, it is necessary to generate the image data to be sent to the communication unit UN4 for facsimileing and the preview image data to be displayed on the operation display unit UN2. Particularly, because the user needs to confirm the preview image before determining on continuing the facsimileing operation, it is necessary to generate the preview image data in short time.

Figure 2:
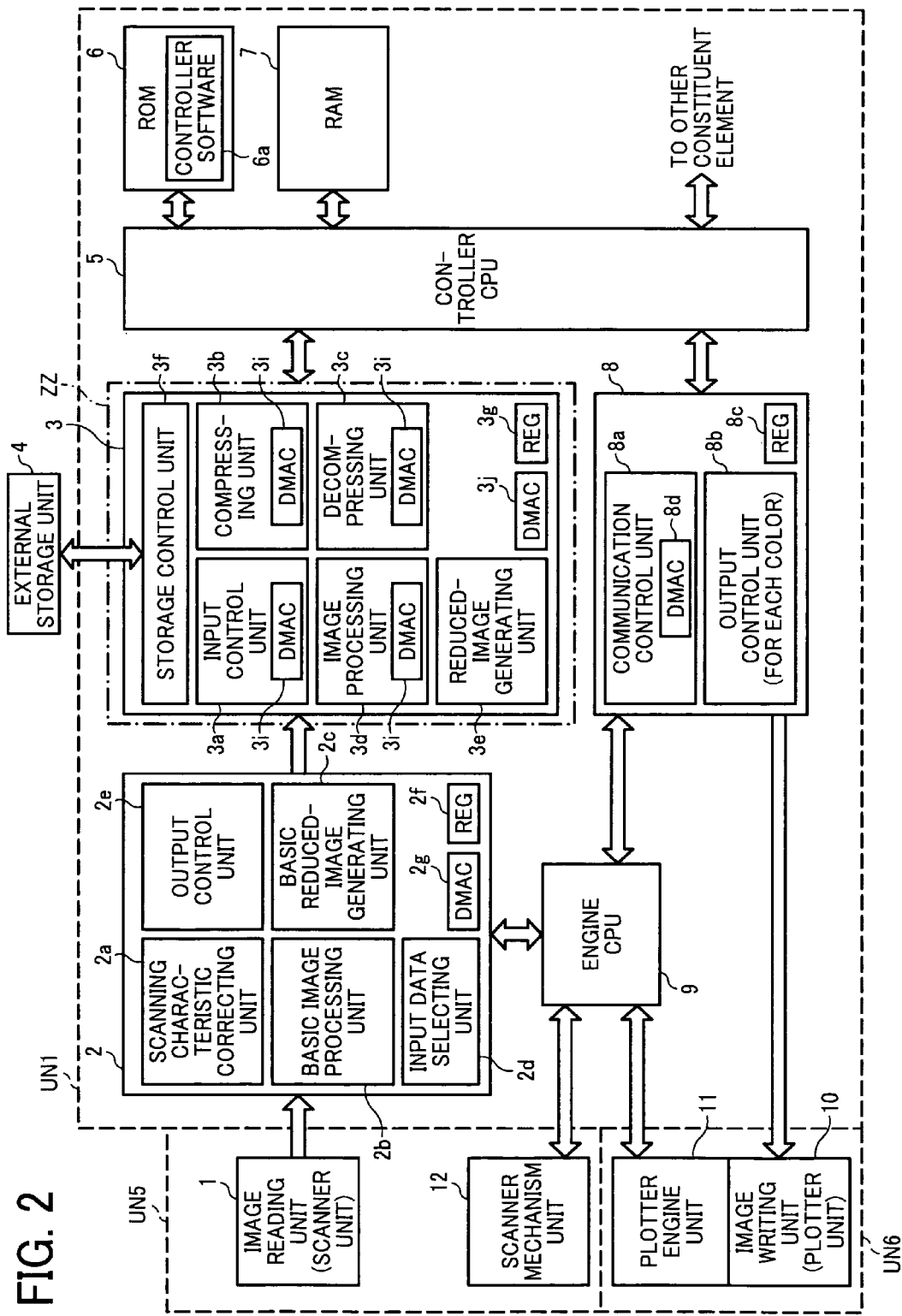
FIG. 2 is a block diagram of an exemplary maximum configuration of a controller unit shown in FIG. 1.

FIG. 2 is a block diagram of a configuration example of the controller unit UN1, particularly of an image processing section of the controller unit UN1, when the scanner unit UN5 and the plotter unit UN6 are attached to the image forming apparatus. The configuration shown in FIG. 2 is hereinafter referred to as maximum configuration according to the first embodiment. As shown in FIG. 2, an expansion board equipped with a controller image processing unit 3 is attached to the expanded I/F unit ZZ in the controller unit UN1.

An image reading unit 1 disposed in the scanner unit UN5 reads an original image, generates image data, and sends the image data to a scanner image processing unit 2 disposed in the controller unit UN1. The scanner image processing unit 2 includes a scanning characteristic correcting unit 2a, a basic image processing unit 2b, a basic reduced-image generating unit 2c, an input data selecting unit 2d, an output control unit 2e, a register (REG) 2f, and a direct memory access controller (DMAC) 2g. Out of those constituent elements, the basic image processing unit 2b, the basic reduced-image generating unit 2c, and the input data selecting unit 2d are kept in a disable state for the maximum configuration.

In other words, for the maximum configuration, only the scanning characteristic correcting unit 2a and the output control unit 2e are kept in an enable state. The scanning characteristic correcting unit 2a converts the received image data into normalized image data. The output control unit 2e selects image data to be output from the scanner image processing unit 2. The register 2f is used to store identification information (ID) of the scanner image processing unit 2. A controller central processing unit (CPU) 5 described in detail later uses that identification information to verify the configuration/characteristics of the scanner image processing unit 2. The DMAC 2g is used for data transfer from the scanner image processing unit 2.

The scanning characteristic correcting unit 2a performs various processing operations such as shading correction, gamma conversion, filter processing, and color conversion to convert the received image data into normalized image data. Herein, the color conversion is not RGB-to-CMYK color conversion but RGB-to-RGB color conversion, which is a known technique performed mainly to eliminate variability in the image reading characteristics of the scanner unit UN5.

If the controller image processing unit 3 is not attached to the expanded I/F unit ZZ, the basic image processing unit 2b and the basic reduced-image generating unit 2c perform image processing and image reducing on the normalized image data as a substitute for the controller image processing unit 3.

The basic image processing unit 2b performs one or more of a plurality of image processing operations, described later in detail, on the normalized image data.

The input data selecting unit 2d selects, depending on the type of reduced-image data (described later) to be generated by the basic reduced-image generating unit 2c, one or more image processing operations to be performed by the basic image processing unit 2b.

The operations of the basic image processing unit 2b, the basic reduced-image generating unit 2c, the input data selecting unit 2d, and the output control unit 2e are controlled by instructions from an engine CPU 9 described later.

The controller image processing unit 3 is configured with an application specific integrated circuit (ASIC) and is detachably attached to the expanded I/F unit ZZ.

The controller image processing unit 3 includes an input control unit 3a that receives the image data output from the scanner image processing unit 2. Meanwhile, if the controller image processing unit 3 is not attached to the expanded I/F unit ZZ, the image data output from the scanner image processing unit 2 is sent to an output port of the expanded I/F unit ZZ. For that, the input control unit 3a in the controller image processing unit 3 is configured to have a bridge structure.

The controller image processing unit 3 further includes a compressing unit 3b that compresses the image data received by the input control unit 3a, a decompressing unit 3c that performs data decompression, an image processing unit 3d that generates image data according to an output format, a reduced-image generating unit 3e that performs a predetermined image reducing operation on the received image data to generate a predetermined reduced image (e.g., a preview image or a thumbnail-size image), and a storage control unit 3f that stores data in an external storage unit 4 such as a magnetic storage unit and reads stored data from the external storage unit 4.

The image processing unit 3d performs RGB-to-CMYK color conversion and advanced gradation processing to convert color image data into monochromatic image data. Upon completion of the image processing by the image processing unit 3d, it is the CMYK image data that is subjected to image processing at subsequent stages.

Each of the input control unit 3a, the compressing unit 3b, the decompressing unit 3c, the storage control unit 3f, and the image processing unit 3d includes a DMAC 3i for data transfer. Meanwhile, instead of implementing a direct memory access (DMA) transfer technique, it is also possible to implement a direct transfer technique for data transfer from each of the input control unit 3a, the compressing unit 3b, the decompressing unit 3c, the storage control unit 3f, and the image processing unit 3d.

The controller image processing unit 3 further includes an I/F circuit (not shown) that is used for data communication with the controller CPU 5 that controls data transfer in entirety, a DMAC 3j for data transfer from the controller image processing unit 3, and a register 3g used to store identification information (ID) of the controller image processing unit 3. The controller CPU 5 uses that identification information to verify the configuration/characteristics of the controller image processing unit 3. Meanwhile, although the DMAC 3j and the controller CPU 5 are shown to share a common I/F in FIG. 3, it is also possible to arrange separate dedicated I/Fs.

A read only memory (ROM) 6 is used to store data such as computer programs executed by the controller CPU 5. The controller CPU 5 reads the computer programs from the ROM 6 and executes then to control operations of the other constituent elements.

Moreover, the ROM 6 is used to store a controller software 6a that the controller CPU 5 reads on start-up and executes to control various operations of the controller unit UN1.

Given below is the description of the expanded I/F unit ZZ and an expansion board 30a detachably attached to the expanded I/F unit ZZ.

Figure 3:
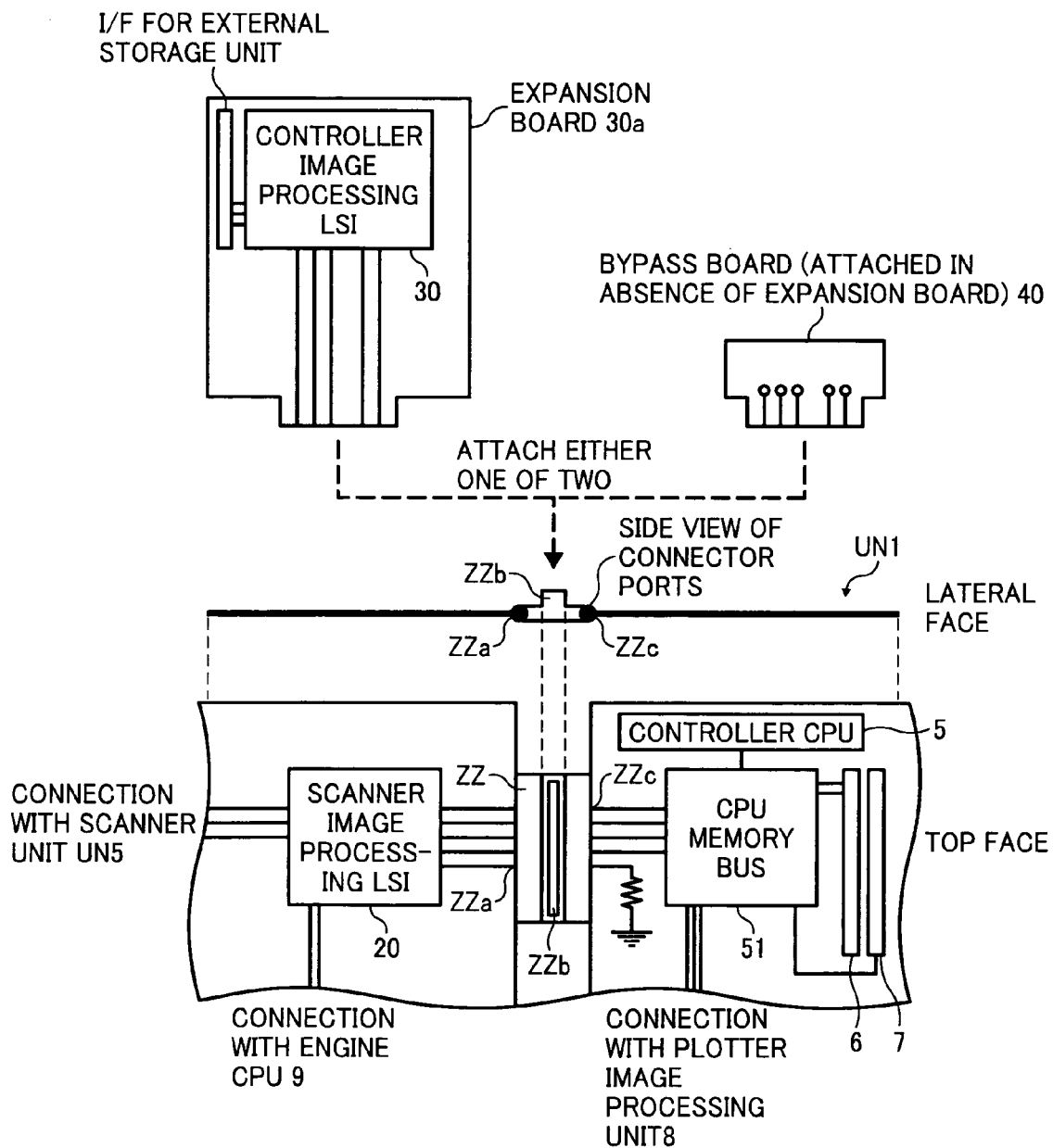
FIG. 3 is a configuration diagram of an expanded interface (I/F) unit and an expansion board that can be detachably attached to the expanded I/F unit.

FIG. 3 is a configuration diagram of the expanded I/F unit ZZ and the expansion board 30a that can be detachably attached to the expanded I/F unit ZZ. A controller image processing LSI 30 is mounted on the expansion board 30a. The controller image processing LSI 30 implements the functions of the controller image processing unit 3. Similarly, a scanner image processing LSI 20 is disposed for implementing the functions of the scanner image processing unit 2. The expanded I/F unit ZZ and a CPU memory bus 51 are arranged between the scanner image processing LSI 20 and the controller CPU 5.

Figure 4:
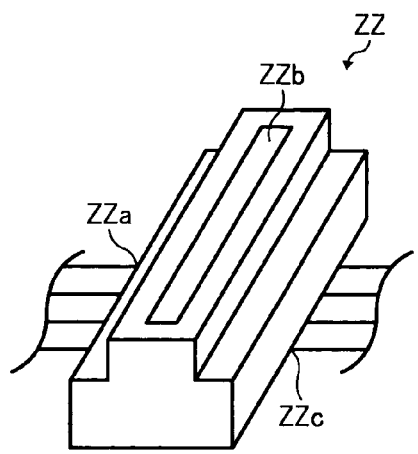
FIG. 4 is a schematic diagram of a hardware shape of the expanded I/F unit.

The expanded I/F unit ZZ has three connection ports ZZa, ZZb, and ZZc. The scanner image processing LSI 20 is attached to the expanded I/F unit ZZ via the connection port ZZa, while the CPU memory bus 51 is attached to the expanded I/F unit ZZ via the connection port. ZZc. For the maximum configuration of the image forming apparatus, the expansion board 30a equipped with the controller image processing LSI 30 is attached to the expanded I/F unit ZZ via the connection port ZZb; while for a basic configuration of the image forming apparatus, a bypass board 40 is attached to the expanded I/F unit ZZ via the connection port ZZb. FIG. 4 is a schematic diagram of a hardware shape of the expanded I/F unit ZZ. The connection port ZZb has a shape to which the expansion board 30a can be attached.

The connection ports ZZa and ZZc are formed in the horizontal direction along the paper surface and the connection port ZZb is formed vertically at the center between the connection ports ZZa and ZZc.

Figure 5:
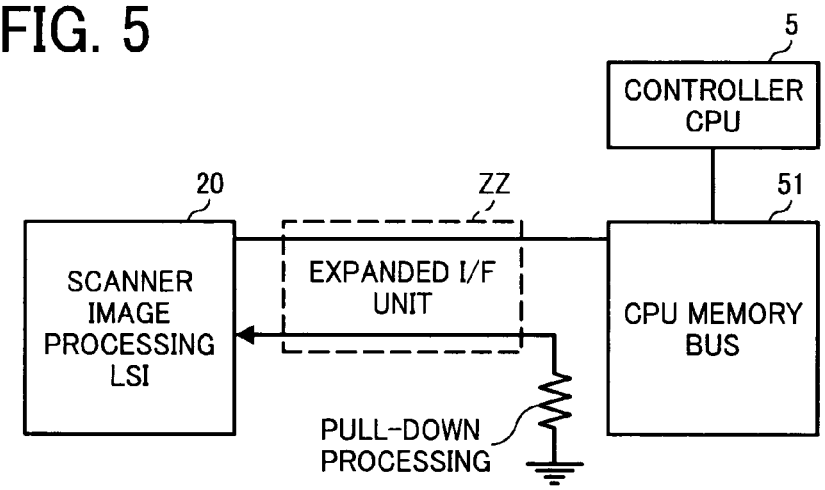
FIG. 5 is a schematic diagram of an exemplary configuration when a scanner image processing large-scale integration (LSI) and a CPU memory bus are interconnected by wires on a bypass board via a connector.

FIG. 5 is a schematic diagram of an exemplary case in the basic configuration when the scanner image processing LSI 20 and the CPU memory bus 51 are interconnected by wires on the bypass board 40 via a connector. Consequently, data signals between the scanner image processing LSI 20 and the CPU memory bus 51 get directly coupled by the wires on the bypass board 40, which is attached to the connection port ZZb of the expanded I/F unit ZZ. That enables the controller CPU 5 to directly send an operating mode value to the scanner image processing LSI 20 via the CPU memory bus 51.

Figure 6:
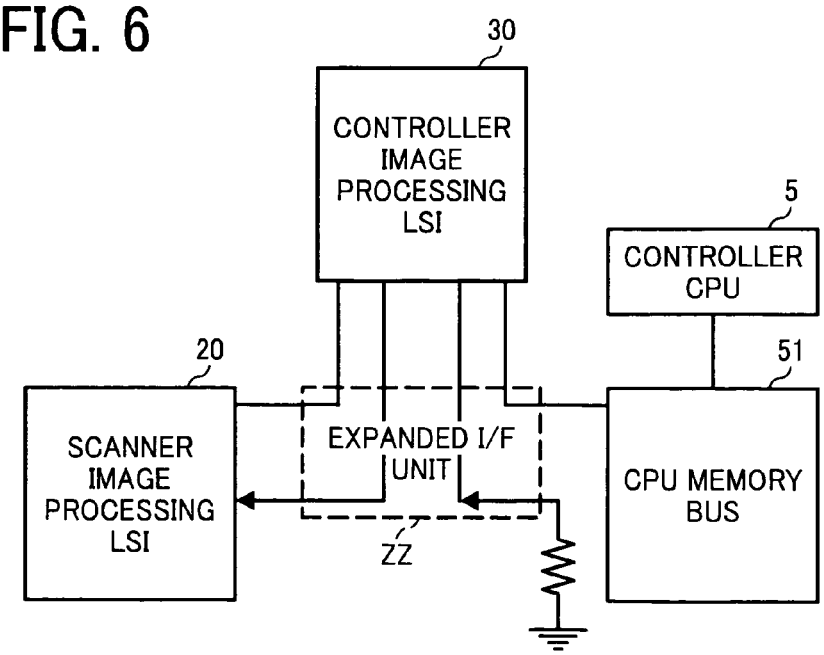
FIG. 6 is a schematic diagram of an exemplary configuration when each of the scanner image processing LSI and the CPU memory bus is connected to a controller image processing LSI by wires on the expansion board via a connector.

FIG. 6 is a schematic diagram of an exemplary case in the maximum configuration when each of the scanner image processing LSI 20 and the CPU memory bus 51 is connected to the controller image processing LSI 30 by wires on the expansion board 30a via a connector. The expansion board 30a is attached to the connection port ZZb of the expanded I/F unit ZZ. The data communication between the CPU memory bus 51 and the controller image processing LSI 30 and between the scanner image processing LSI 20 and the controller image processing LSI 30 is performed with a PCI Express bus.

Thus, in the controller unit UN1, when the controller image processing unit 3 is not attached to the expanded I/F unit ZZ, the controller CPU 5 can directly communicate with the scanner image processing unit 2; and when the controller image processing unit 3 is attached to the expanded I/F unit ZZ, each of the controller CPU 5 and the scanner image processing unit 2 can directly communication with the controller image processing unit 3.

When the expansion board 30a is attached for the first time, the computer programs stored in the ROM 6 are updated and a control program for controlling the controller image processing LSI 30 is newly stored in the ROM 6.

In the example shown in FIG. 3, the expansion board 30a and the bypass board 40 are formed in a flat plate-like shape and provided with a connecting portion at the bottom portion. For attaching the expansion board 30a or the bypass board 40, the corresponding connecting portion is inserted into the expanded I/F unit ZZ. However, at the time of actual mounting, it is also possible to form the connecting portion of the expansion board 30a and a mounting portion of the controller image processing LSI 30 to be orthogonal to each other, i.e., in a hook-like shape to effectively use a space above the expanded I/F unit ZZ in FIG. 3.

Reverting to the description with reference to FIG. 2, a random access memory (RAM) 7 in the controller unit UN1 includes work area utilized by the controller CPU 5 and a buffer area used to store a variety of data.

A plotter image processing unit 8 in the controller unit UN1 includes a communication control unit 8a, an output control unit 8b, and a register 8c. The communication control unit 8a includes a DMAC 8d and controls communication between the controller CPU 5 and the engine CPU 9. The output control unit 8b sends image data of each color component of CMYK to an image writing unit 10 in the plotter unit UN6 at a separate timing.

Moreover, the plotter image processing unit 8 includes an I/F for the controller CPU 5, which controls data transfer of image data in entirety. Although, in FIG. 2, a single I/F is shown to be shared for image data and the controller CPU 5, it is also possible to arrange separate dedicated I/Fs. The register 8c is used to store identification information (ID) of the plotter image processing unit 8. The controller CPU 5 uses that identification information to verify the configuration/characteristics of the plotter image processing unit 8.

The engine CPU 9 receives instructions from the controller CPU 5 and accordingly sets the operating mode of the scanner image processing unit 2 and controls the operations of a plotter engine unit 11 in the plotter unit UN6 and a scanner mechanism unit 12 in the scanner unit UN5.

When the controller image processing unit 3 is attached to the expanded I/F unit ZZ, the engine CPU 9 controls the scanner image processing unit 2 such that the image data processed by the scanner image processing unit 2 is output to the controller image processing unit 3. For example, the engine CPU 9 sets a dummy address as the destination for the output control unit 2e in the scanner image processing unit 2. Subsequently, image data appended with a dummy address as the destination is output from the scanner image processing unit 2 to the directly-connected controller image processing unit 3. The controller image processing unit 3 acknowledges the received image data as image data to be processed by itself.

Figure 7:
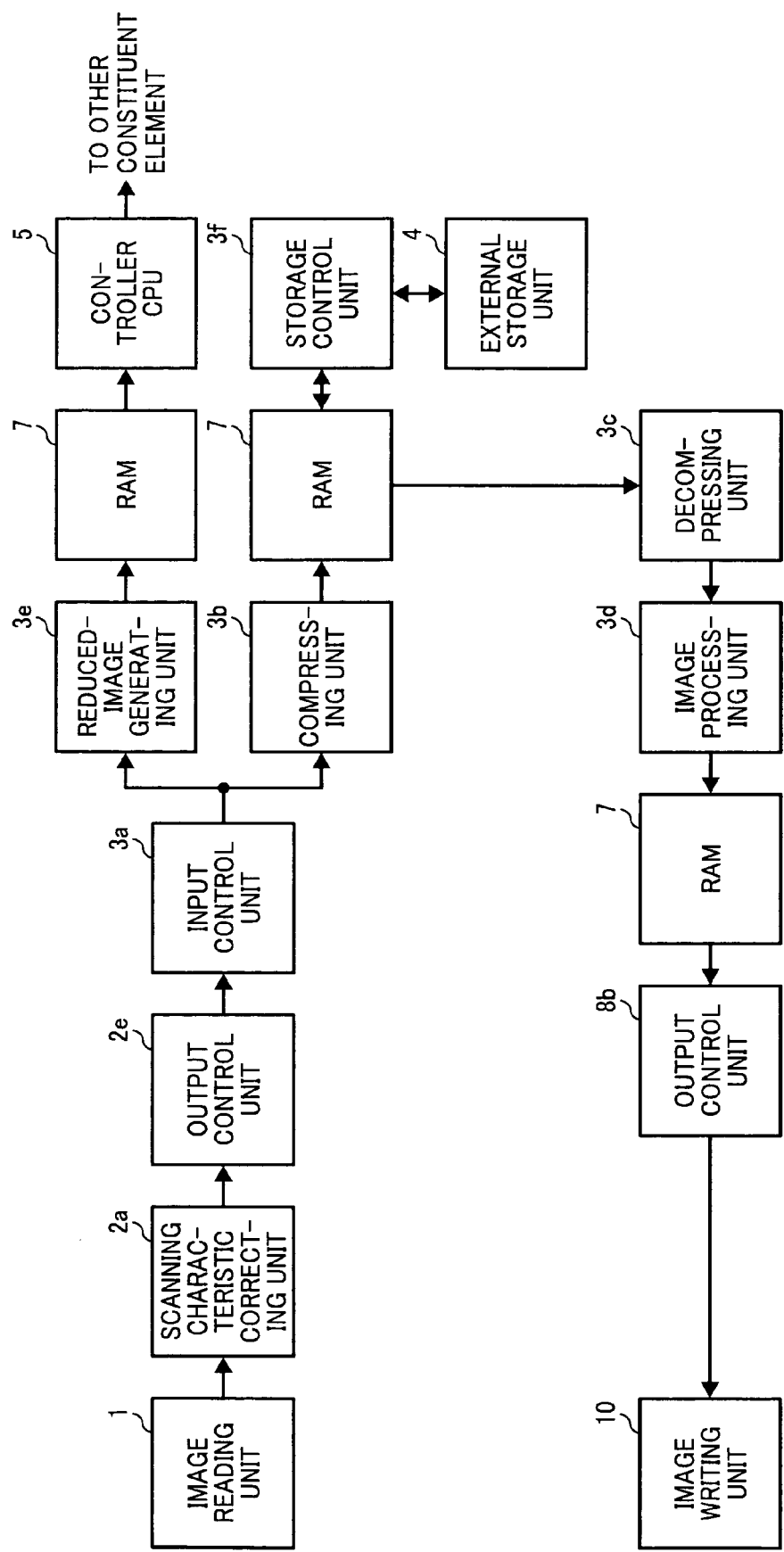
FIG. 7 is a block diagram of an example of image processing operations for the maximum configuration shown in FIG. 2.

FIG. 7 is a block diagram of an example of image processing operations performed on the image data when the image forming apparatus has the maximum configuration shown in FIG. 2.

In this case, the controller CPU 5 has a direct access to the controller image processing unit 3 and the plotter image processing unit 8 but has no direct access to the scanner image processing unit 2. Therefore, the controller CPU 5 accesses the register 3g in the controller image processing unit 3 and the register 8c in the plotter image processing unit 8 and reads the corresponding identification information (ID) therefrom.

The controller CPU 5 then verifies the identification information (ID) read from the register 3g. In the present example, as the value of the identification information (ID) matches with a value indicating the controller image processing unit 3, the controller CPU 5 recognizes that the image forming apparatus has the maximum configuration.

Subsequently, the controller CPU 5 instructs the engine CPU 9 via the communication control unit 8a to set the scanner image processing unit 2 in an operating mode in which the basic image processing unit 2b, the basic reduced-image generating unit 2c, and the input data selecting unit 2d are kept in the disable state and in which the output control unit 2e selects output data of only the basic image processing unit 2b (i.e., in this case, output data of the scanning characteristic correcting unit 2a).

Accordingly, the engine CPU 9 sets the instructed operating mode in a control register (not shown), which is used to set the operating mode of the scanner image processing unit 2.

The image processing operations shown in FIG. 7 start after the scanner image processing unit 2 is set to the instructed operating mode. First, the image reading unit 1 sends the generated image data to the scanning characteristic correcting unit 2a for various processing operations such as shading correction, gamma conversion, filter processing, and color conversion. Then, the output control unit 2e outputs the processed image data to the input control unit 3a disposed in the controller image processing unit 3.

The input control unit 3a sends the received image data to the compressing unit 3b and the reduced-image generating unit 3e. The compressing unit 3b compresses the image data with a predetermined compression technique and temporarily stores the compressed image data in the RAM 7. The storage control unit 3f stores the compressed image data in the external storage unit 4.

The reduced-image generating unit 3e generates the preview image data and stores it in the RAM 7. The preview image data is sent to the other constituent elements (in this case, the operation display unit UN2) via the controller CPU 5.

The preview image data is image data of coarse quality that is generated to be displayed on the operation display unit UN2 in short order for user preview. However, if it is necessary to display detailed preview image data or display the preview image data in a different mode, then the compressed image data stored in the external storage unit 4 is decompressed and subjected to necessary image processing operations before the reduced-image generating unit 3e generates the suitable preview image data and sends it to the operation display unit UN2. For example, such a case arises when the user performs a zooming-in operation or when the preview image data is displayed in a progressive display mode in which the details are displayed in a gradual manner.

Meanwhile, a thumbnail-size image (of about one-sixteenth the size of the copy image) of a list of images stored in the external storage unit 4 can also be generated, if necessary, after generating the preview image data of coarse quality. Alternatively, the thumbnail-size image can be generated at first instead of generating the preview image data of coarse quality.

Upon storing the compressed image data of a single page or of a predetermined volume in the external storage unit 4, the storage control unit 3f reads the stored image data from the external storage unit 4 and sends it to the decompressing unit 3c for decompression via the RAM 7.

The decompressing unit 3c decompresses the compressed image data to the image data of original size and sends the decompressed image data to the image processing unit 3d. The image processing unit 3d performs color conversion on the received image data and then stores the processed image data (CMYK print data) in the RAM 7.

When the CMYK print data of a single page or of a predetermined volume is stored in the RAM 7, the controller CPU 5 sends the stored CMYK print data to the output control unit 8b disposed in the plotter image processing unit 8.

The output control unit 8b then sends the CMYK print data to the image writing unit 10 in synchronization with the timing of the image writing unit 10. The image writing unit 10 prints the CMYK print data on a sheet of paper and discharges the printed sheet.

Meanwhile, the DMAC 3j in the controller image processing unit 3 and the DMAC 2g in the scanner image processing unit 2 perform data transfer to the RAM 7, which is connected to the controller CPU 5, while generating memory addresses or access data from the RAM 7. The DMACs 3j and 2g implement a descriptor method in which continuous data is dividedly stored in a memory or discreet data stored in a memory is accessed by automatic concatenating. Consequently, it becomes possible to perform memory management or image management with an operating software (OS) of the controller software 6a that runs in the controller CPU 5. For that, the values determined by the OS of the controller software 6a are set. Thus, the controller software 6a performs address setting for the DMACs 3j and 2g.

Figure 8:
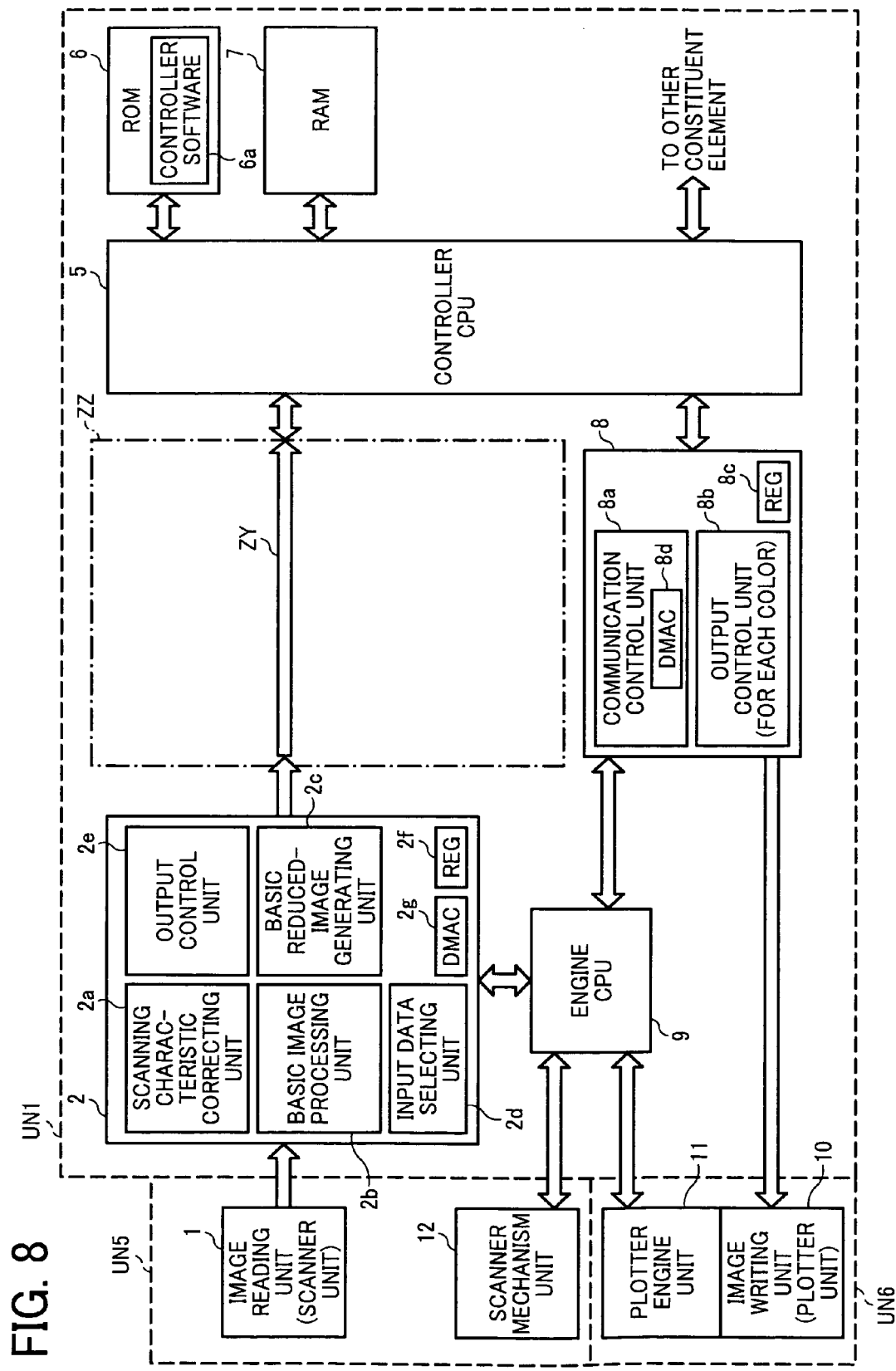
FIG. 8 is a block diagram of an exemplary basic configuration of the controller unit shown in FIG. 1.

FIG. 8 is a block diagram of another configuration example of the controller unit UN1, particularly of the image processing section of the controller unit UN1, when the scanner unit UN5 and the plotter unit UN6 are attached to the image forming apparatus. The configuration shown in FIG. 8 is hereinafter referred to as basic configuration according to the first embodiment. The constituent elements shown in FIG. 8 that are identical to the constituent elements shown in FIG. 2 are referred to by the same reference numerals and their description is not repeated.

In the basic configuration, the controller image processing unit 3 is not attached to the expanded I/F unit ZZ. Moreover, in the expanded I/F unit ZZ, the input port (the output port of the scanner image processing unit 2) and the output port (the I/F for the controller CPU 5) are connected by a signal line ZY. Thus, the controller CPU 5 has a direct access to the scanner image processing unit 2.

Figure 9:
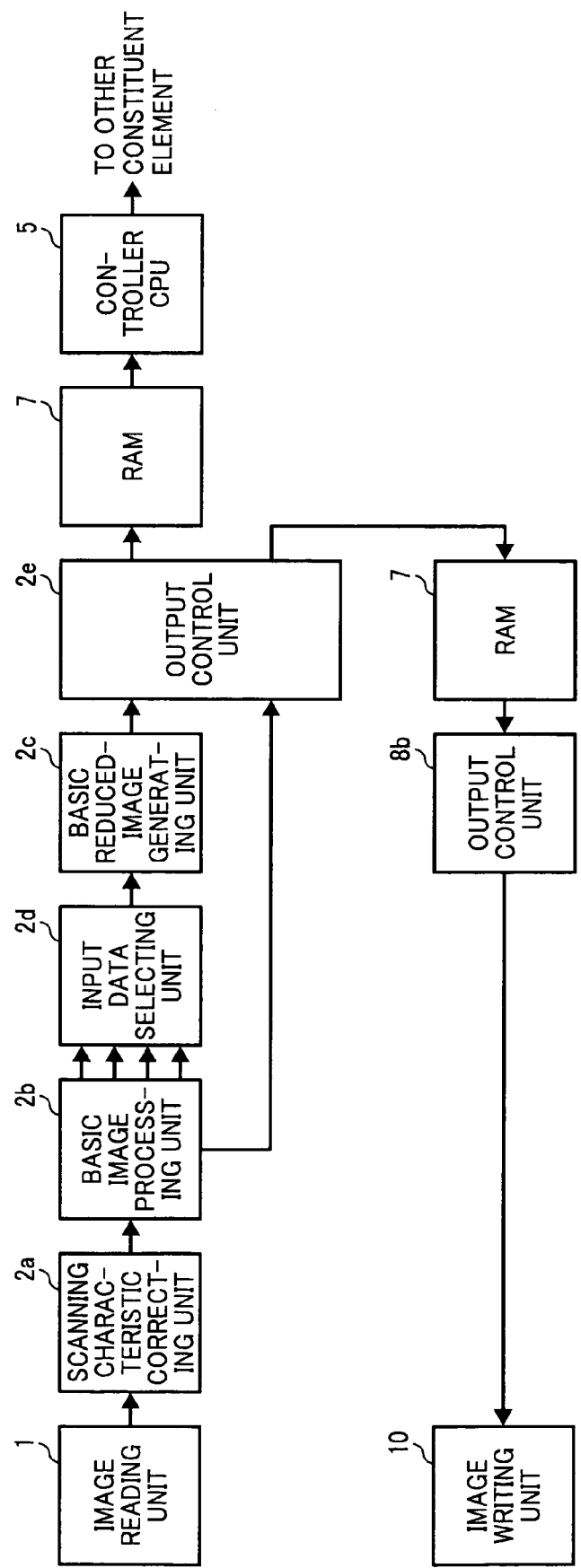
FIG. 9 is a block diagram of an example of image processing operations for the basic configuration shown in FIG. 8.

FIG. 9 is a block diagram of an example of image processing operations performed when the image forming apparatus has the basic configuration shown in FIG. 8.

Figure 10:
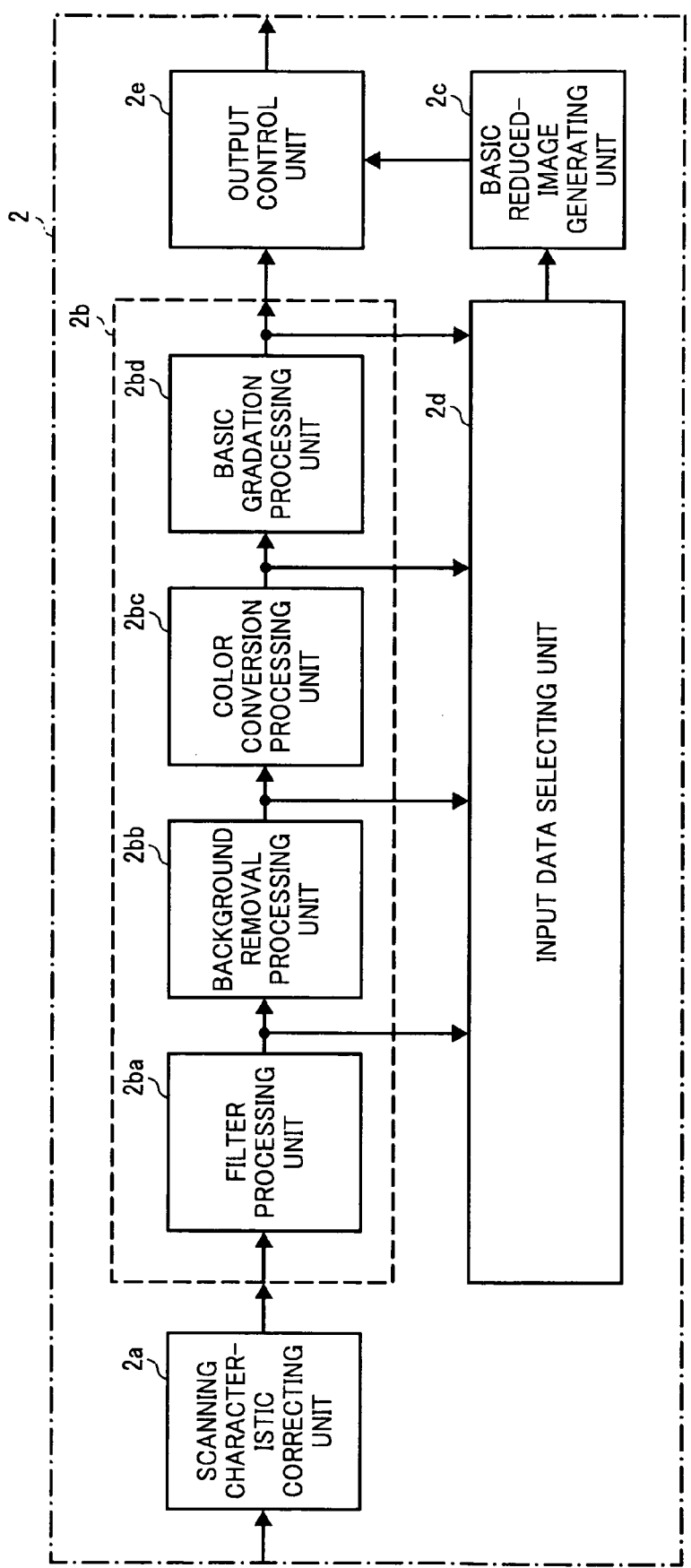
FIG. 10 is a block diagram of a scanner image processing unit shown in FIG. 2.

FIG. 10 is a block diagram of the scanner image processing unit 2. In the scanner image processing unit 2, the basic image processing unit 2b includes a filter processing unit 2ba, a background removal processing unit 2bb, a color conversion processing unit 2bc, and a basic gradation processing unit 2bd. The filter processing unit 2ba implements a known filter processing technique to adjust the image characteristics of the output data of the scanning characteristic correcting unit 2a. The background removal processing unit 2bb implements a known background removal technique to clean the background of the image in the output data of the filter processing unit 2ba. The color conversion processing unit 2bc performs color conversion (e.g., RGB-to-CMYK color conversion) according to an output format on the output data of the background removal processing unit 2bb. The basic gradation processing unit 2bd implements a known and basic gradation processing technique on the output data of the color conversion processing unit 2bc.

The basic gradation processing performed by the basic gradation processing unit 2bd and the advanced gradation processing performed by the image processing unit 3d differs in the fact that, for example, the image data subjected to the basic gradation processing has 2 bits and 4 gradations and the image data subjected to the advanced gradation processing has 4 bits and 16 gradations. Thus, although the image data processed by the basic gradation processing unit 2bd has less image quality than the image data processed by the image processing unit 3d, there is no problem as long as the image quality fulfils the demands of an image forming apparatus having the basic configuration.

Depending on the type of reduced-image data (described later) generated by the basic reduced-image generating unit 2c, the input data selecting unit 2d selects the output data of any one of the filter processing unit 2ba, the background removal processing unit 2bb, the color conversion processing unit 2bc, and the basic gradation processing unit 2bd and sends the selected output data to the basic reduced-image generating unit 2c.

For the basic configuration, the controller CPU 5 has a direct access to the scanner image processing unit 2 and the plotter image processing unit 8. Thus, the controller CPU 5 accesses the register 2f in the scanner image processing unit 2 and the register 8c in the plotter image processing unit 8 and reads the corresponding identification information (ID) therefrom.

The controller CPU 5 then verifies the identification information (ID) read from the register 2f. In the present example, since the value of the identification information (ID) matches with a value indicating the scanner image processing unit 2, the controller CPU 5 recognizes that the image forming apparatus has the basic configuration.

Subsequently, the controller CPU 5 instructs the engine CPU 9 via the communication control unit 8a to set the scanner image processing unit 2 in an operating mode in which the basic image processing unit 2b, the basic reduced-image generating unit 2c, and the input data selecting unit 2d are kept in the enable state.

Accordingly, the engine CPU 9 sets the instructed operating mode in a control register (not shown), which is used to set the operating mode of the scanner image processing unit 2.

The image processing operations shown in FIG. 9 start after the scanner image processing unit 2 is set to the instructed operating mode. First, the image reading unit 1 sends the generated image data to the scanning characteristic correcting unit 2a for various processing operations such as shading correction, gamma conversion, filter processing, and color conversion. Then, the scanning characteristic correcting unit 2a outputs the processed image data to the basic image processing unit 2b. In the basic image processing unit 2b, the filter processing unit 2ba, the background removal processing unit 2bb, the color conversion processing unit 2bc, and the basic gradation processing unit 2bd sequentially process the received image data.

As described above, the input data selecting unit 2d selects the output data of any one of the filter processing unit 2ba, the background removal processing unit 2bb, the color conversion processing unit 2bc, and the basic gradation processing unit 2bd and sends the selected output data to the basic reduced-image generating unit 2c. For example, if image preview without background removal is selected as an option in the copying operation, then the input data selecting unit 2d selects the output data of the filter processing unit 2ba and sends it to the basic reduced-image generating unit 2c. On the other hand, if image preview with background removal is selected as an option in the copying operation, then the input data selecting unit 2d selects the output data of the background removal processing unit 2bb and sends it to the basic reduced-image generating unit 2c. Moreover, if image preview of a multi-value image (before gradation processing) is selected as an option in the facsimileing operation (or the network facsimileing operation), then the input data selecting unit 2d selects the output data of the color conversion processing unit 2bc and sends it to the basic reduced-image generating unit 2c. Furthermore, if image preview of a low-value image (after gradation processing) is selected as an option in the facsimileing operation (or the network facsimileing operation), then the input data selecting unit 2d selects the output data of the basic gradation processing unit 2bd and sends it to the basic reduced-image generating unit 2c.

Herein, since the external storage unit 4 is not used for the basic configuration, it is not possible to store the image data for generating the preview image data at a latter stage. Thus, depending on the operating mode or the display mode, the input data selecting unit 2d needs to select the image data that has been subjected to image processing in the basic image processing unit 2b and send the selected image data to the basic reduced-image generating unit 2c. Moreover, the basic reduced-image generating unit 2c needs to compress the received image data to a resolution necessary for detailed previewing, rather than generating image data of coarse quality.

As a result, generating the preview image data in the image forming apparatus having the basic configuration takes more time than generating the preview image data of coarse quality in the image forming apparatus having the maximum configuration. Moreover, it is also difficult to generate the preview image data of necessary resolution for detailed previewing at the outset, as opposed to the case when the preview image data of necessary resolution is generated at a latter stage.

However, since the basic configuration without the controller image processing unit 3 is mainly used for a low-cost image forming apparatus, the required resolution of the operation display unit UN2 or the required display speed is generally low. Thus, in practice, generally the resolution of the preview image data generated for detailed previewing does not cause a problem. On the contrary, using the controller image processing unit 3 for a low-cost image apparatus can result in overengineering of the image forming apparatus thereby increasing the manufacturing cost. Meanwhile, since the external storage unit 4 is not used for the basic configuration, the thumbnail-size image of a list of stored images is not used.

The preview image data generated by the basic reduced-image generating unit 2c and the output data of the basic image processing unit 2b undergoes arbitration in the output control unit 2e and is temporarily stored in the RAM 7 as CMYK print data.

When the CMYK print data of a single page or of a predetermined volume is stored in the RAM 7, the controller CPU 5 sends the stored CMYK print data to the output control unit 8b in the plotter image processing unit 8.

The output control unit 8b then sends the CMYK print data to the image writing unit 10 in synchronization with the timing of the image writing unit 10. The image writing unit 10 prints the CMYK print data on a sheet of paper and discharges the printed sheet.

Given below is the description of input-output processing of data in the basic reduced-image generating unit 2c.

In the basic image processing unit 2b, the filter processing unit 2ba and the background removal processing unit 2bb output RGB image data; while the color conversion processing unit 2bc and the basic gradation processing unit 2bd output CMYK image data. Thus, the basic reduced-image generating unit 2c is configured to compress both the RGB image data and the CMYK image data.

Figure 11A:
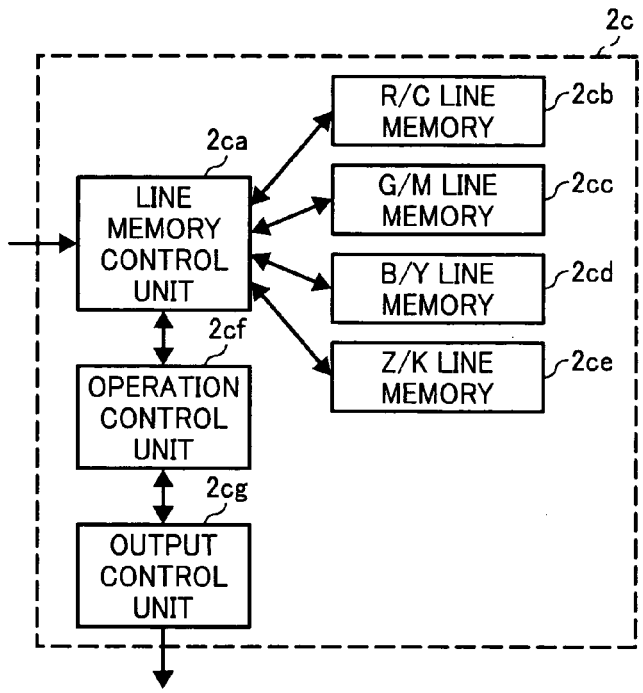
FIGS. 11A to 11C are schematic diagrams for explaining an exemplary configuration of a basic reduced-image generating unit shown in FIG. 2 and input-output processing of data in the basic reduced-image generating unit.
Figure 11B:
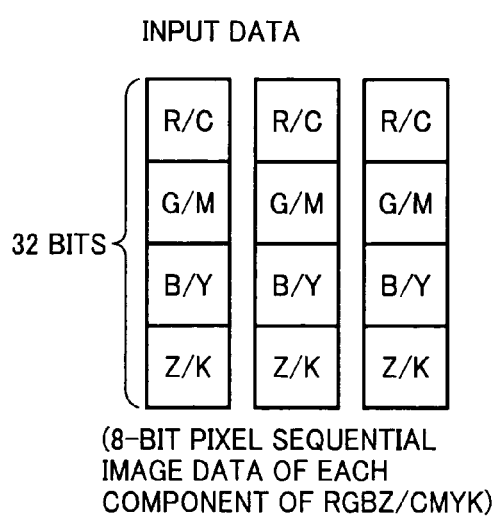
Figure 11C:
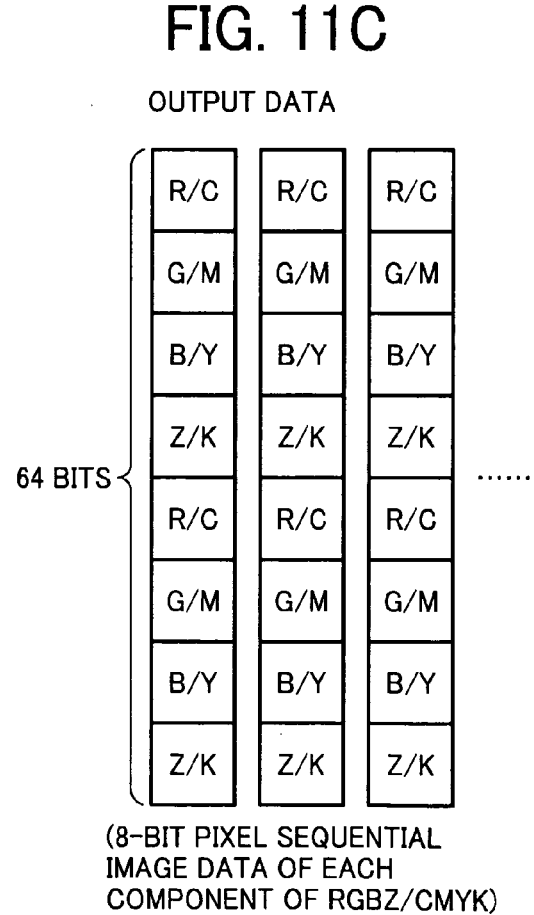

FIGS. 11A to 11C are schematic diagrams for explaining an exemplary configuration of the basic reduced-image generating unit 2c and input-output processing of data in the basic reduced-image generating unit 2c. FIG. 11A illustrates an exemplary configuration of the basic reduced-image generating unit 2c. FIG. 11B illustrates input data input into the basic reduced-image generating unit 2c and FIG. 11C illustrates output data output from the basic reduced-image generating unit 2c. The basic reduced-image generating unit 2c receives an input of 32-bit pixel sequential image data having 8 bits each of RGBZ (Z having value "0") or CMYK. The basic reduced-image generating unit 2c processes the input data and outputs 64-bit pixel sequential image data having 8 bits each of RGBZ (Z having value "0") or CMYK.

In the basic reduced-image generating unit 2c, a line memory control unit 2ca stores each of the RGBZ color components or the CMYK color components of the input data in an R/C line memory 2cb, a G/M line memory 2cc, a B/Y line memory 2cd, and a Z/K line memory 2ce, respectively.

Depending on a request from an operation control unit 2cf that performs the image reducing operation, the line memory control unit 2ca reads the data stored in the R/C line memory 2cb, the G/M line memory 2cc, the B/Y line memory 2cd, and the Z/K line memory 2ce and sends it to the operation control unit 2cf.

The operation control unit 2cf sends the result of the image reducing operation to an output control unit 2cg. Subsequently, the output control unit 2cg converts the received result into 64-bit pixel sequential image data and outputs it to the output control unit 2e.

Meanwhile, it is not possible to display a CMYK image as the preview image. However, for facsimileing, only the K color component can be used from the CMYK image.

Given below is the description of input-output processing of data in the reduced-image generating unit 3e.

The reduced-image generating unit 3e does not receive CMYK image data as input data and is configured to process line sequential image data corrected by the scanning characteristic correcting unit 2a. Moreover, the reduced-image generating unit 3e outputs pixel sequential image data as the displayable preview image data.

Figure 12A:
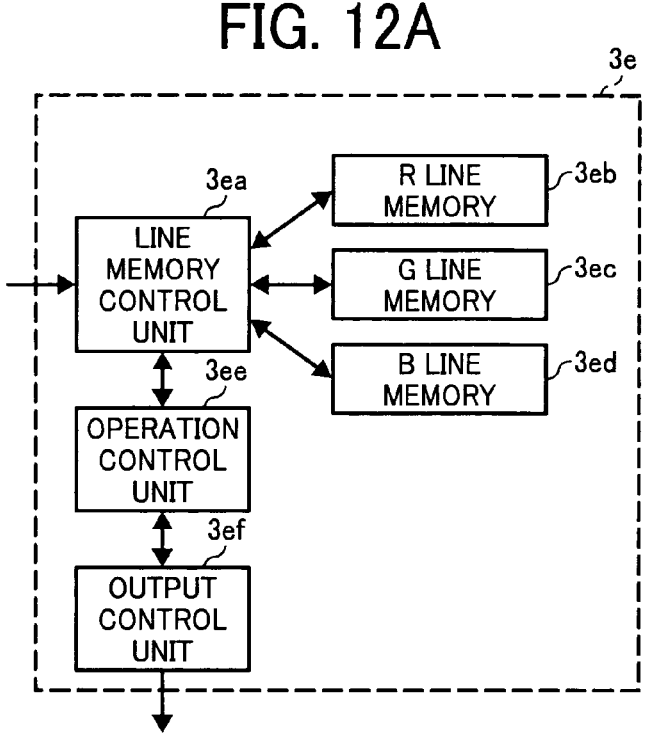
FIGS. 12A to 12 C are schematic diagrams for explaining an exemplary configuration of a reduced-image generating unit shown in FIG. 2 and input-output processing of data in the reduced-image generating unit.
Figure 12B:
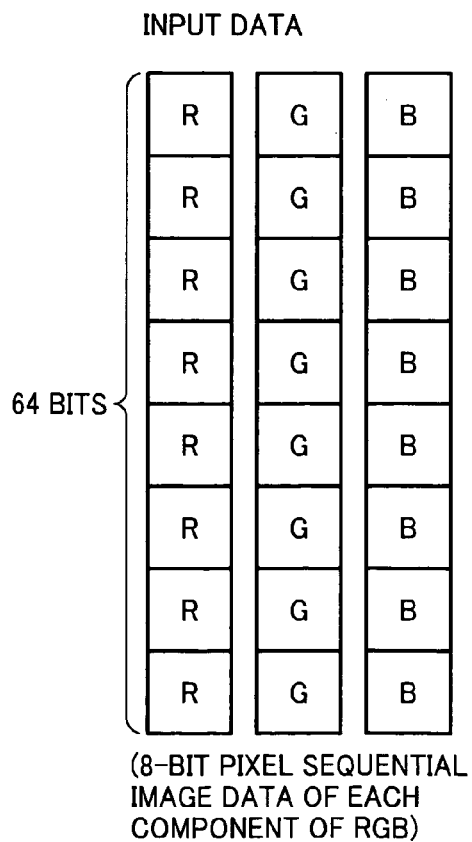
Figure 12C:
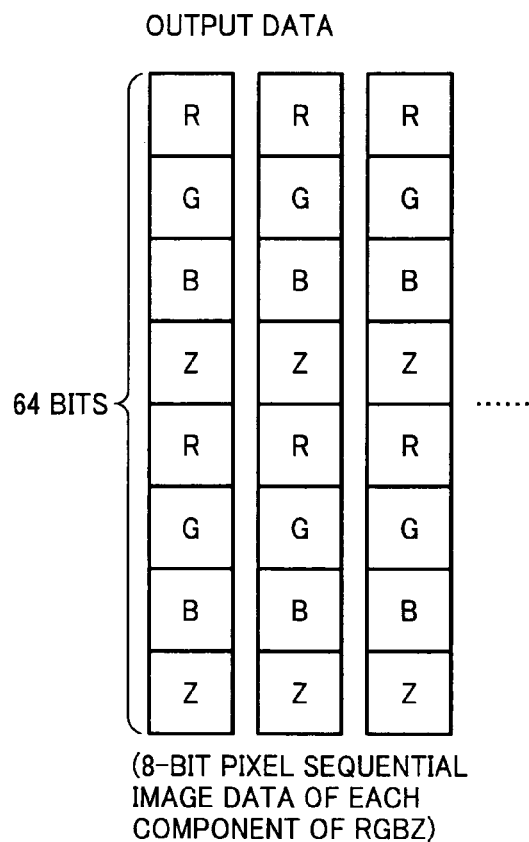

FIGS. 12A to 12C are schematic diagram for explaining an exemplary configuration of the reduced-image generating unit 3e and input-output processing of data in the reduced-image generating unit 3e. FIG. 12A illustrates an exemplary configuration of the reduced-image generating unit 3e. FIG. 12B illustrates input data input into the reduced-image generating unit 3e and FIG. 12C illustrates output data output from the reduced-image generating unit 3e. The reduced-image generating unit 3e receives an input of 64-bit line sequential image data having 8 bits each of RGB. The reduced-image generating unit 3e processes the input data and outputs 64-bit pixel sequential image data having 8 bits each of RGBZ (Z having value "0").

In the reduced-image generating unit 3e, a line memory control unit 3ea stores each of the RGB color components of the input data in an R line memory 3eb, a G line memory 3ec, and a B line memory 3ed, respectively.

Depending on a request from an operation control unit 3ee that performs the image reducing operation, the line memory control unit 3ea reads data stored in the R line memory 3eb, the G line memory 3ec, and the B line memory 3ed and sends it to the operation control unit 3ee.

The operation control unit 3ee can implement a plurality of image reducing methods such as simple pixel skipping, OR pixel skipping, and averaging. Depending on the type of image reducing, (e.g., generation of preview image data of coarse quality with priority to the processing speed or generation of thumbnail-size image data with high magnification ratio), the operation control unit 3ee selects the image reducing method.

Then, the operation control unit 3ee sends the result of the image reducing operation to an output control unit 3ef. Subsequently, the output control unit 3ef converts the received result into 64-bit pixel sequential image data and stores it in the RAM 7.

Figure 13:
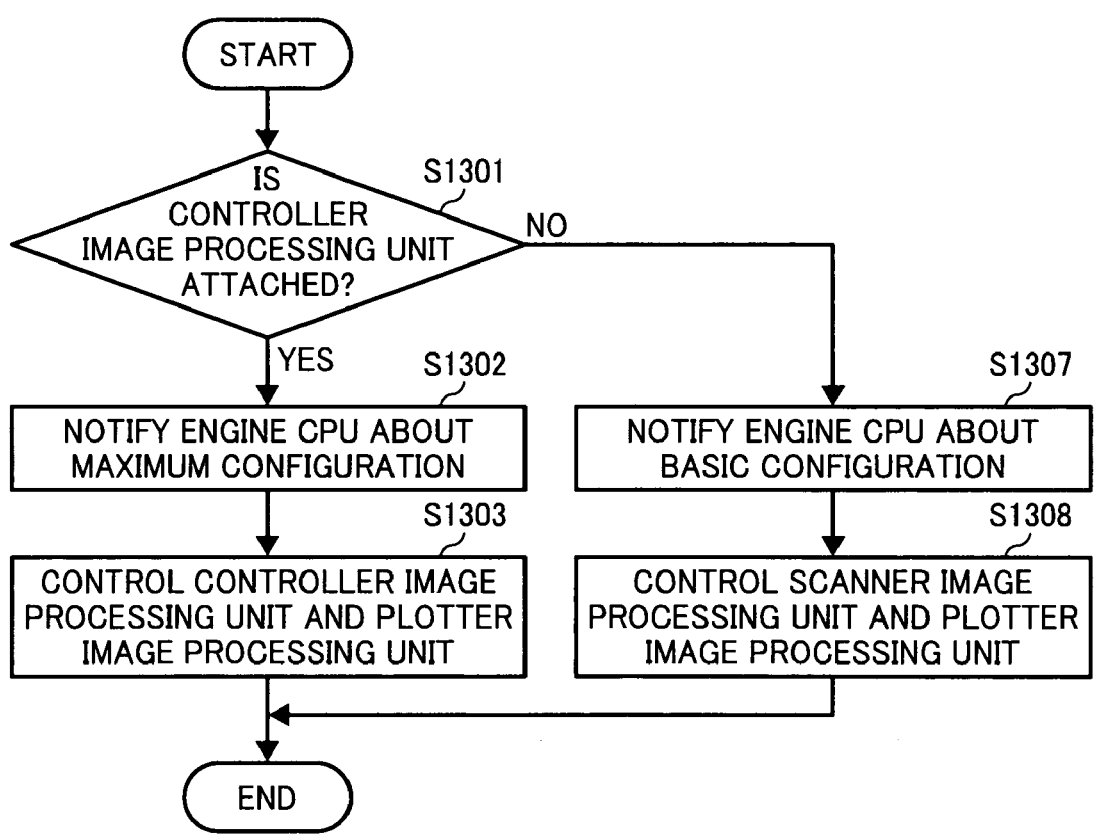
FIG. 13 is a flowchart for explaining the operations performed by the controller unit shown in FIG. 1 when it recognizes the configuration (maximum or basic) of the image forming apparatus.

FIG. 13 is a flowchart for explaining the operations performed by the controller unit UN1 when it recognizes the configuration (maximum or basic) of the image forming apparatus.

When the power is turned ON, the controller software 6a searches for the identification information (ID) of the constituent element to which the controller CPU 5 has a direct access and determines whether the controller image processing unit 3 is attached (Step S1301).

If the identification information (ID) is that of the controller image processing unit 3, the controller software 6a recognizes that the image forming apparatus has the maximum configuration (Yes at Step S1301) and notifies the engine CPU 9 about the same (Step S1302). Then, the engine CPU 9 keeps the basic image processing unit 2b, the basic reduced-image generating unit 2c, and the input data selecting unit 2d in the disable state.

The controller software 6a then treats the controller image processing unit 3 and the plotter image processing unit 8 as the target constituent elements for control (Step S1303).

If the identification information (ID) is that of the scanner image processing unit 2, the controller software 6a recognizes that the image forming apparatus has the basic configuration (No at Step S1301) and notifies the engine CPU 9 about the same (Step S1307). The controller software 6a then treats the scanner image processing unit 2 and the plotter image processing unit 8 as the target constituent elements for control (Step S1308).

Meanwhile, as described above, the external storage unit 4 is used to store the compressed image data obtained by implementing a predetermined compression technique. However, from the data security perspective, the compressed image data can be encrypted before storing into the external storage unit 4. Thus, even if the external storage unit 4 is lost to theft, the stored image data is prevented from being used in an inappropriate manner.

Moreover, although the image reducing operation is described for generating a preview image, it is also applicable in generating a thumbnail-size image (of about one-sixteenth the size of the copy image) of a list of images stored in the external storage unit 4.

In this way, according to the first embodiment, the configuration of an image forming apparatus can be changed by attaching or detaching the controller image processing unit 3. Thus, it is possible to easily configure an image forming apparatus that can perform various functions according to the user requirement. Moreover, such a feature enables to reduce the burden on the developer while developing various configurations of an image forming apparatus.

Furthermore, since the controller image processing unit 3, the scanner unit UN5, the plotter unit UN6, and the communication unit UN4 can be attached to the image forming apparatus in an easily detachable manner, it is possible to change the configuration of the image forming apparatus depending on the user requirement. Moreover, even while providing different configurations of an image forming apparatus, it is possible to use a single control program as it is or only with slight changes thereby reducing the burden on the developer.

In the description according to the first embodiment, the presence or absence of the controller image processing unit 3 determines the configuration of the image forming apparatus for reducing the image size. Alternatively, according to a second embodiment of the present invention, it is also possible determine the configuration of the image forming apparatus for other operations depending on whether the controller image processing unit 3 is disposed.

In an image forming apparatus according to the second embodiment, a controller unit UN11 is disposed in place of the controller unit UN1 described in the first embodiment. Moreover, in the second embodiment, the communication unit UN4 is assumed to be the destination for image data. A typical example of such an image forming apparatus is a communication scanner device. Meanwhile, to simplify the description of the second embodiment, the configuration and description of the plotter unit UN6 is omitted and it is irrelevant whether the plotter unit UN6 is attached to the image forming apparatus.

Figure 14:
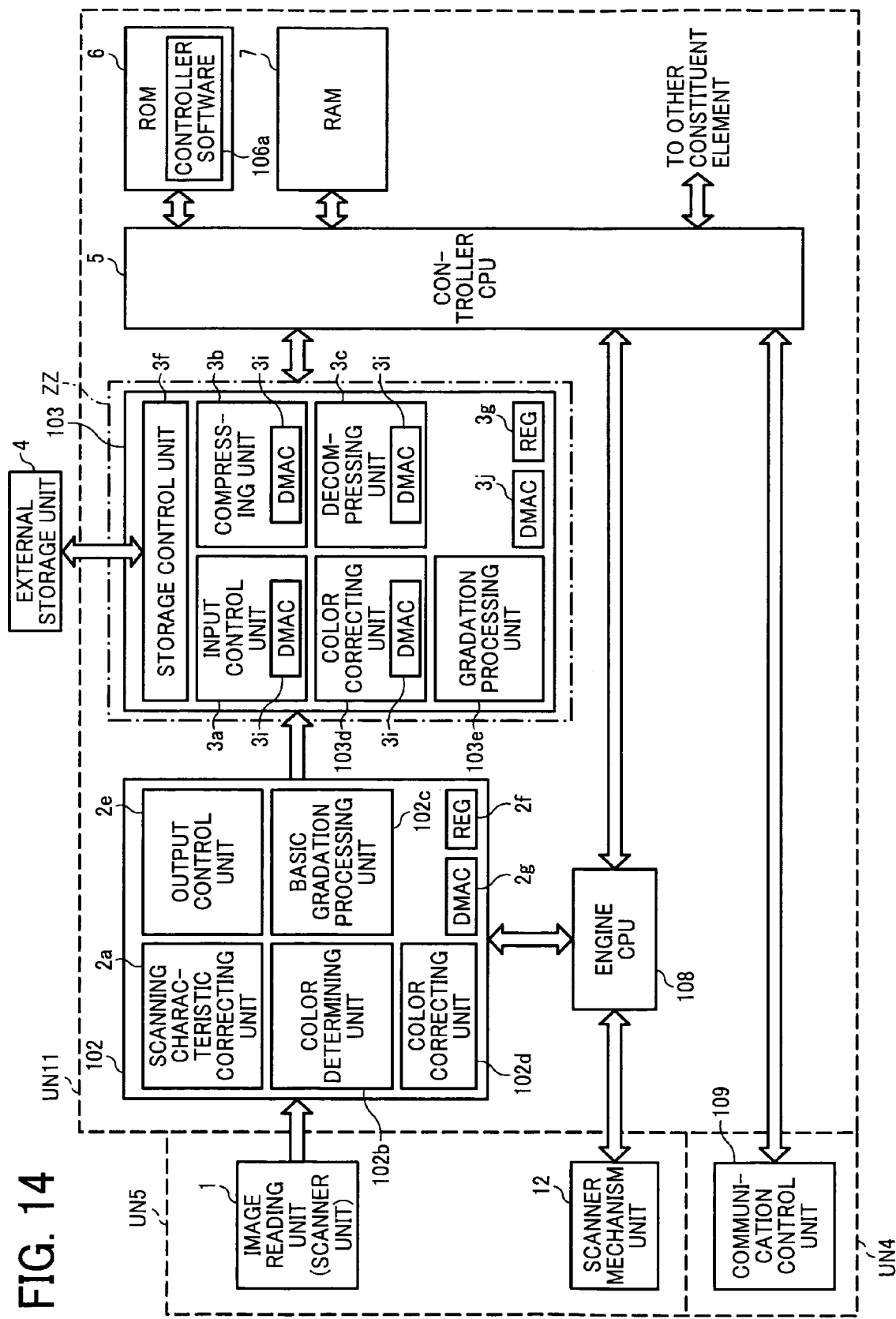
FIG. 14 is a block diagram of an exemplary maximum configuration of a controller unit in an image forming apparatus (image processing apparatus) according to a second embodiment of the present invention.

FIG. 14 is a schematic diagram of a configuration example of the controller unit UN11, particularly of an image processing section of the controller unit UN11, when the scanner unit UN5 and the communication unit UN6 are attached to the image forming apparatus. The configuration shown in FIG. 14 is hereinafter referred to as maximum configuration according to the second embodiment.

The image reading unit 1 in the scanner unit UN5 reads an original image, generates image data, and sends the image data to a scanner image processing unit 102 arranged in the controller unit UN11. The scanner image processing unit 102 includes the scanning characteristic correcting unit 2*a*, a color determining unit 102*b*, a basic gradation processing unit 102*c*, a color correcting unit 102*d*, and the output control unit 2*e*. The scanning characteristic correcting unit 2*a* converts the received image data into normalized image data. The color determining unit 102*b* verifies the normalized image data to determine whether the original is a color original or a monochromatic original. The color correcting unit 102*d* performs color conversion mainly of input RGB image data into output RGB image data or monochromatic image data according to an output format. The basic gradation processing unit 102*c* implements a known and basic gradation processing technique on the image data. The output control unit 2*e* outputs the image data processed in the scanner image processing unit 102. Meanwhile, the constituent elements identical to those described in the first embodiment are referred to by the sane reference numerals and their description is not repeated.

In the case when a controller image processing unit 103 is not attached to the expanded I/F unit ZZ, the color correcting unit 102*d* generates color image data and monochromatic image data from the normalized image data output by the scanning characteristic correcting unit 2*a*.

The color determining unit 102*b* determines whether the normalized image data output by the scanning characteristic correcting unit 2*a* is color image data or monochromatic image data. In other words, the color determining unit 102*b* determines whether the original read by the image reading unit 1 is a color original or a monochromatic original. When the controller image processing unit 103 is not attached to the expanded I/F unit ZZ, the controller CPU 5 refers to the color determination result obtained by the color determining unit 102*b* and sends either one of the color image data and the monochromatic image data generated by the color correcting unit 102*d* to a communication control unit 109 in the communication unit UN4.

The controller image processing unit 103 includes the input control unit 3*a* that receives the image data from the scanner image processing unit 2, the compressing unit 3*b* that compresses the image data received by the input control unit 3*a*, the decompressing unit 3*c* that performs data decompression, a color correcting unit 103*d* that performs color conversion mainly of input RGB image data into output RGB image data or monochromatic image data according to an output format, a gradation processing unit 103*e* that implements a known and advanced gradation processing technique, and the storage control unit 3*f* that stores data in the external storage unit 4 (e.g., a magnetic storage unit) and reads stored data from the external storage unit 4.

The ROM 6 is used to store a controller software 106*a* that, when executed, controls various operations of the controller unit UN11.

More particularly, the controller CPU 5 reads and executes the controller software 106*a* to control the operations of the controller unit UN11 and sends output image data to the communication control unit 109.

An engine CPU 108 receives instructions from the controller CPU 5 and sets the operating mode of the scanner image processing unit 102, notifies the controller CPU 5 of an interrupt signal that indicates the color determination result obtained by the color determining unit 102*b*, and controls the operations of the scanner mechanism unit 12 in the scanner unit UN5.

Herein, the basic gradation processing performed by the basic gradation processing unit 102*c* and the advanced gradation processing performed by the gradation processing unit 103*e* differs in the fact that, for example, the image data subjected to the basic gradation processing has 2 bits and 4 gradations per pixel and the image data subjected to the advanced gradation processing can have 1 bit and 2 gradations per pixel up to 4 bits and 16 gradations per pixel. Thus, depending on the setting, the advanced gradation processing results in better gradation characteristic and highly reproducible image data.

Figure 15:
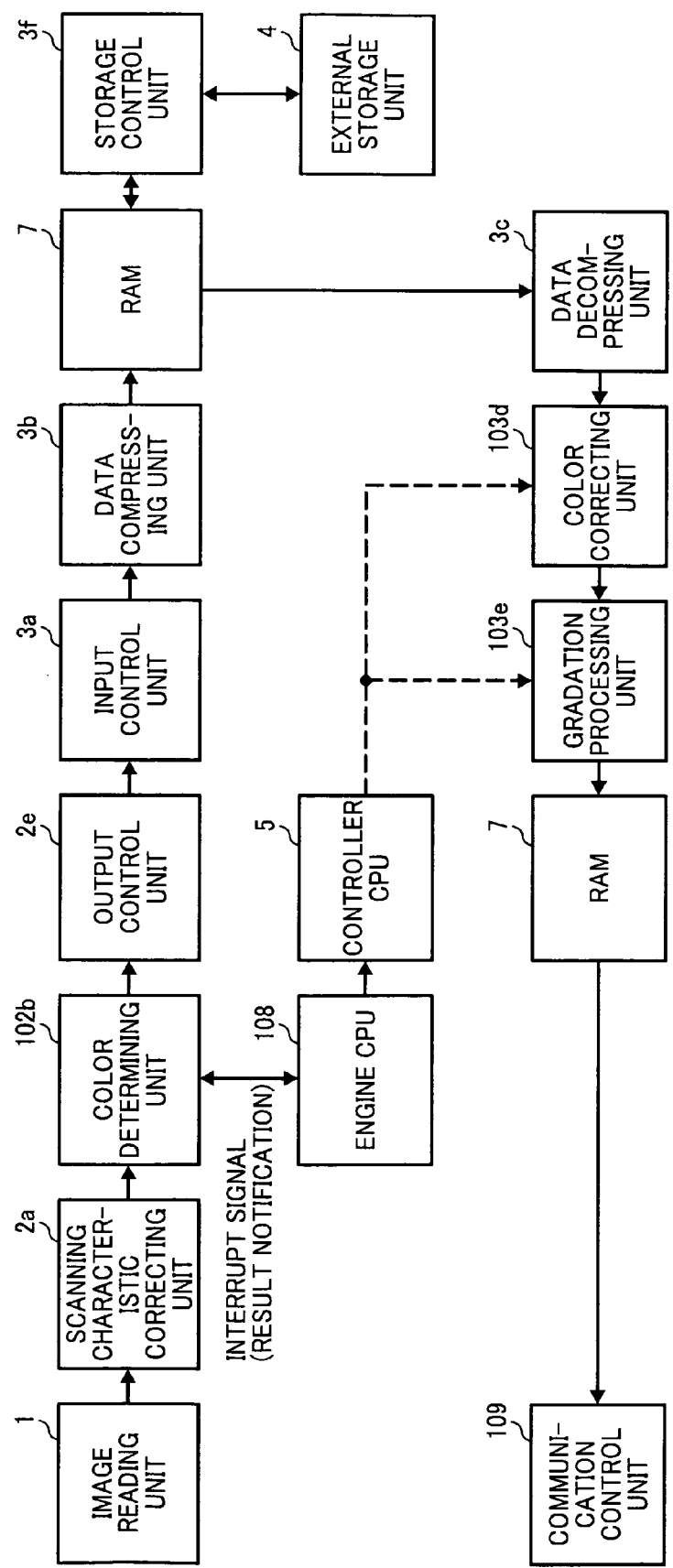
FIG. 15 is a block diagram of an example of image processing operations for the maximum configuration shown in FIG. 14.

FIG. 15 is a block diagram of an example of image processing operations performed on the image data when the image forming apparatus has the maximum configuration shown in FIG. 14.

In this case, the controller CPU 5 accesses the register 3*g* in the controller image processing unit 103 and reads corresponding identification information (ID) therefrom.

The controller CPU 5 then verifies the identification information (ID) read from the register 3*g*. In the present example, since the value of the identification information (ID) matches with a value indicating the controller image processing unit 103, the controller CPU 5 recognizes that the image forming apparatus has the maximum configuration.

In that case, since the color correcting unit 103*d* and the gradation processing unit 103*e* in the controller image processing unit 103 are available for processing, the controller CPU 5 performs setting to keep the basic gradation processing unit 102c and the color correcting unit 102d in the scanner image processing unit 102 in the disable state. Moreover, the controller CPU 5 sets the engine CPU 108 as the recipient of the interrupt signal indicating the color determination result obtained by the color determining unit 102b.

The controller CPU 5 then instructs the engine CPU 108 to set the scanner image processing unit 102 in an operating mode in which the basic gradation processing unit 102c and the color correcting unit 102d are kept in the disable state. Moreover, the controller CPU 5 instructs the engine CPU 108 to receive the interrupt signal from the color determining unit 102b and notify the same.

Accordingly, the engine CPU 108 sets a value corresponding to the instructed operating mode in a control register (not shown), which is used to set the operating mode of the scanner image processing unit 102.

The image processing operations shown in FIG. 15 start after the scanner image processing unit 102 is set to the instructed operating mode. First, the image reading unit 1 sends the generated image data to the scanning characteristic correcting unit 2a for various processing operations such as shading correction, gamma conversion, filter processing, and color conversion. The scanning characteristic correcting unit 2a sends the output data to the color determining unit 102b, while the output control unit 2e sends the same output data to the input control unit 3a in the controller image processing unit 103. At that time, the output control unit 2e packs the image data into RGB line sequential data.

The input control unit 3a performs input processing on the received image data and sends it to the compressing unit 3b. The compressing unit 3b compresses the image data with a predetermined compression technique and temporarily stores the compressed image data in the RAM 7. The storage control unit 3f stores the compressed image data in the external storage unit 4.

When the compressed image data of a single page is stored in the RAM 7, the color determining unit 102b determines whether the stored image data is of a color original or a monochromatic original and outputs the color determination result as an interrupt signal. The engine CPU 108 receives the interrupt signal and notifies the details to the controller CPU 5.

In turn, the controller CPU 5 notifies the color determination result to the color correcting unit 103d and the gradation processing unit 103e.

It is easier for the color determining unit 102b to perform color determination after a single page of image data is read. Consider a case when a color image is present at the leading end of the page. In that case, even when the image reading unit 1 is in the process of reading the page, the color determining unit 102b can determine that the original is a color original. On the other hand, consider a case when a monochromatic image occupies most part of the page and a color image is present at the rear end of the page. In that case, the color determining unit 102b is able to determine that the original is a color original when the image reading unit 1 is about to finish reading the page.

Thus, unless it is possible to determine whether the original is a color original or a monochromatic original, the RGB image data is stored on a temporary basis. Once the color determining unit 102b performs color determination, the stored RGB image data is converted into monochromatic image data or into predetermined RGB image data according to the requirement.

The compressed image data stored in the external storage unit 4 is sent to the decompressing unit 3c. Then, the decompressing unit 3c decompresses the compressed image data to the image data of original size and sends the decompressed image data to the color correcting unit 103d.

When the color determination result received by the color correcting unit 103d indicates that the original is a color original, it converts the received image data into predetermined RGB image data (color image data) according to the output format and outputs the color image data to the gradation processing unit 103e. In this case, the gradation processing unit 103e does not perform gradation processing on the received color image data and stores the received data as it is in the RAM 7.

On the other hand, when the color determination result received by the color correcting unit 103d indicates that the original is a monochromatic original, it converts the received image data into monochromatic image data and outputs it to the gradation processing unit 103e. Then, the gradation processing unit 103e performs gradation processing on the monochromatic image data to obtain, for example, monochromatic image data having two gradations (two-value image data) and stores it in the RAM 7.

Meanwhile, as compared to the data conversion of the RGB image data stored in the external storage unit 4, the image reading operations of the image reading unit 1 are difficult to stop midway through. Thus, the image reading operations are performed on a priority basis. The data conversion of the RGB image data stored in the external storage unit 4 can be performed betweenwhiles the image reading operations or during idle time.

The controller CPU 5 sends the color image data or the monochrome image data stored in the RAM 7 to the communication control unit 109.

The controller image processing unit 103 includes the DMAC 3j and the scanner image processing unit 102 includes the DMAC 2g. The paths for data transfer by using the DMACs 3j and 2g can be arbitrarily set. Hence, the detailed description thereof is not given.

Figure 16:
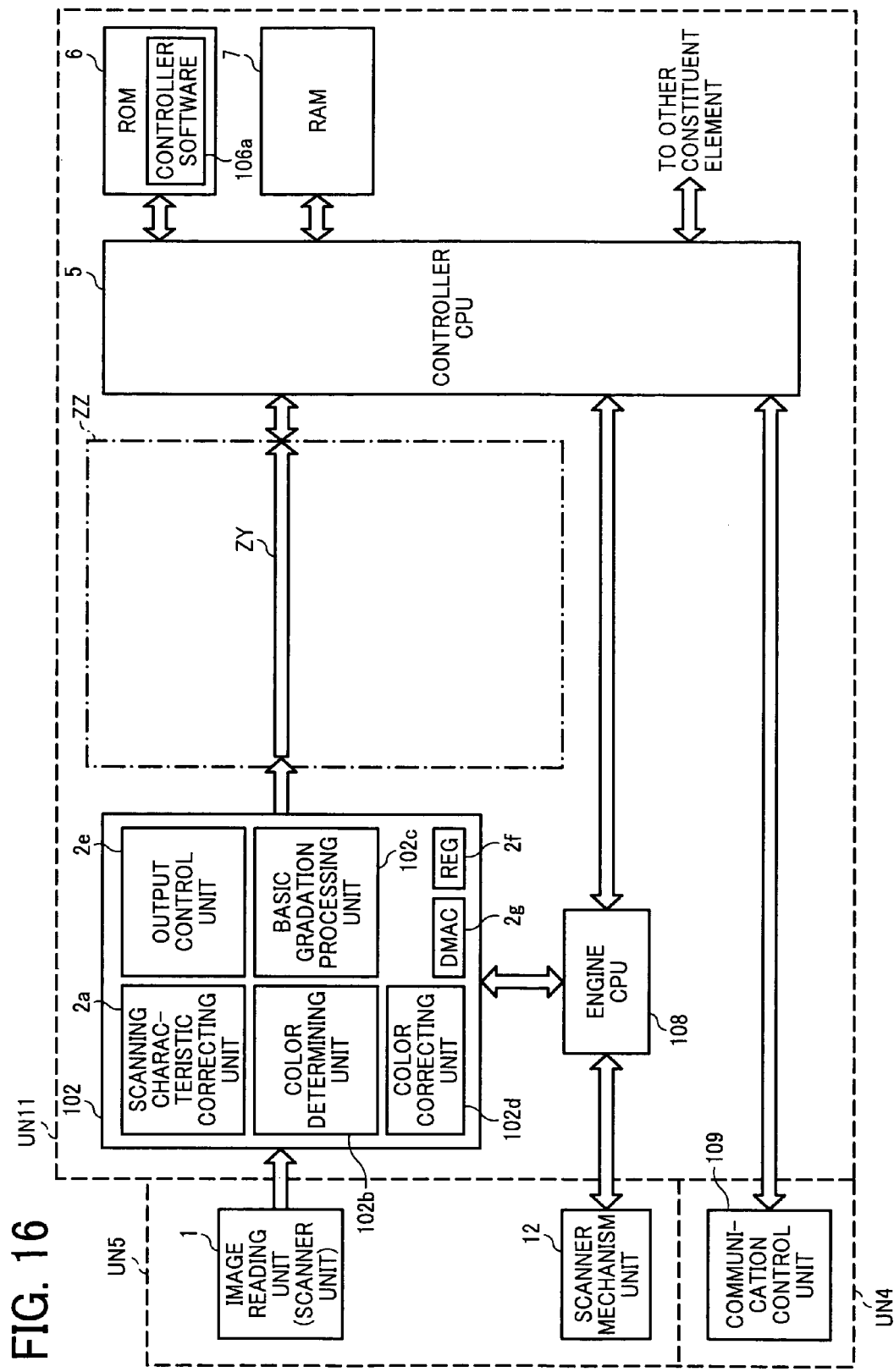
FIG. 16 is a block diagram of an exemplary basic configuration of the controller unit shown in FIG. 14.

FIG. 16 is a schematic diagram of another configuration example of the controller unit UN11, particularly of the image processing section of the controller unit UN11, when the scanner unit UN5 and the communication unit UN4 are attached to the image forming apparatus. The configuration shown in FIG. 16 is hereinafter referred to as basic configuration according to the second embodiment. The constituent elements shown in FIG. 16 that are identical to the constituent elements shown in FIG. 14 are referred to by the same reference numerals and their description is not repeated.

For the basic configuration, the controller image processing unit 103 is not attached to the expanded I/F unit ZZ. In the expanded I/F unit ZZ, the input port (the output port of the scanner image processing unit 102) and the output port (the I/F for the controller CPU 5) are connected by the signal line ZY. Thus, the controller CPU 5 has a direct access to the scanner image processing unit 102.

Figure 17:
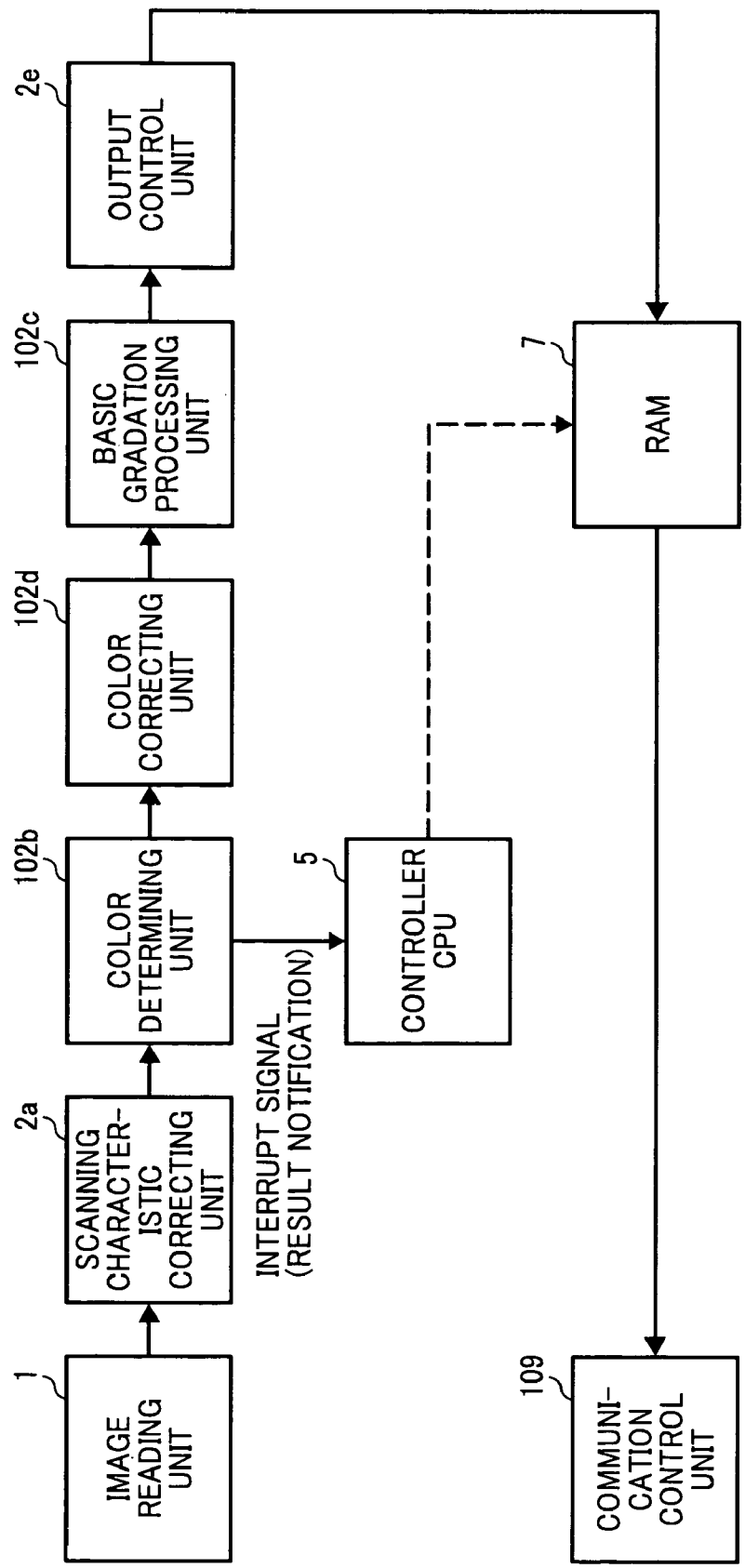
FIG. 17 is a block diagram of an example of image processing operations for the basic configuration shown in FIG. 16.

FIG. 17 is a block diagram of an example of image processing operations performed when the image forming apparatus has the basic configuration shown in FIG. 16.

Since the controller CPU 5 has a direct access to the scanner image processing unit 102 in the basic configuration, the controller CPU 5 accesses the register 2f in the scanner image processing unit 102 and reads the corresponding identification information (ID) therefrom.

The controller CPU 5 then verifies the identification information (ID) read from the register 2f. In the present example, since the value of the identification information (ID) matches with a value indicating the scanner image processing unit 102, the controller CPU 5 recognizes that the image forming apparatus has the basic configuration.

Subsequently, the controller CPU 5 performs setting to keep the basic gradation processing unit 102c and the color correcting unit 102d in the scanner image processing unit 102 in the enable state and sets itself as the recipient of an interrupt signal that indicates the color determination result obtained by the color determining unit 102b.

The controller CPU 5 then instructs the engine CPU 108 to set the scanner image processing unit 102 in an operating mode in which the basic gradation processing unit 102c and the color correcting unit 102d are kept in the enable state and in which the interrupt signal from the color determining unit 102b is directly sent to itself.

Accordingly, the engine CPU 108 sets a value corresponding to the instructed operating mode in a control register (not shown), which is used to set the operating mode of the scanner image processing unit 102.

The image processing operations shown in FIG. 17 start after the scanner image processing unit 102 is set to the instructed operating mode. First, the image reading unit 1 sends the generated image data to the scanning characteristic correcting unit 2a for various processing operations such as shading correction, gamma conversion, filter processing, and color conversion. The scanning characteristic correcting unit 2a sends the output data to the color determining unit 102b and the color correcting unit 102d.

The color correcting unit 102d converts the received image data into two types of image data, predetermined RGB image data (color image data) and monochromatic image data, at the same time according to the output format and outputs the color image data and the monochromatic image data to the basic gradation processing unit 102c.

The basic gradation processing unit 102c sends the color image data to the output control unit 2e without performing gradation processing. On the other hand, the basic gradation processing unit 102c performs gradation processing on the monochromatic image data to obtain two-value image data having 1 bit per pixel and sends that monochromatic image data to the output control unit 2e.

The output control unit 2e stores the color image data and the monochromatic image data in the RAM 7.

When the color image data and the monochromatic image data of a single page is stored in the RAM 7, the color determining unit 102b outputs the color determination result for that page as an interrupt signal, which the controller CPU 5 receives.

When the color determination result indicates a color original, the controller CPU 5 destroys the monochromatic image data from the RAM 7 and sends the color image data stored in the RAM 7 to the communication control unit 109. On the other hand, when the color determination result indicates a monochromatic original, the controller CPU 5 destroys the color image data from the RAM 7 and sends the monochromatic image data stored in the RAM 7 to the communication control unit 109.

Such an operation is necessary because the controller image processing unit 103 is not disposed for the basic configuration and hence the external storage unit 4 cannot be used for storing image data.

More particularly, on the one hand, the image reading operation of the image reading unit 1 is difficult to stop midway through; and on the other hand, the RAM 7 cannot be used to store a large volume of image data because of a low storage capacity. Thus, instead of temporarily storing RGB image data in the RAM 7 and converting it into monochromatic image data at a latter timing as in the case of the maximum configuration, the RGB image data and the monochromatic image data are generated at the same time and, as soon as the color determination result is known, only the appropriate type of image data is selected for further processing and the image data of the other type is destroyed.

Since the external storage unit 4 is not used to store image data, reuse of the selected image data is not possible. Thus, upon completion of the predetermined image processing, the selected image data can also be destroyed. Moreover, by immediately destroying the non-selected image data, the RAM 7 is does not get full with unnecessary image data. That allows continuous image processing of image data, although the memory size used to process image data of a single original temporarily increases.

Meanwhile, the operations that the controller unit UN11 performs to recognize the configuration (maximum or basic) of the image forming apparatus are identical to those described with reference to FIG. 13.

Moreover, the description according to the second embodiment is applicable not only to an MFP but also to any image processing apparatus (image forming apparatus) that has image reading functionality. For the basic configuration of an image processing apparatus, CMYK color image data and monochromatic image data can be generated at the same time. On the other hand, for the maximum configuration of an image processing apparatus, RGB image data can be temporarily stored and either one of CMYK color image data and monochromatic image data can be generated from the stored RGB image data according to the requirement.

Thus, for the basic configuration according to the second embodiment, there is no need to repeat the image processing operations depending on whether the read image data is of a color original or a monochromatic original. That, in addition to the advantage produced according to the first embodiment, enhances the user-friendliness of the image processing apparatus.

Meanwhile, the computer programs (e.g., control software) that are used to control the operations of an image processing apparatus (or an image forming apparatus) can be stored in a ROM in advance.

Moreover, the computer programs (e.g., control software) executed in the image processing apparatus (or an image forming apparatus) can also be stored as installable and executable files in a computer-readable storage medium such as a compact disk read only memory (CD-ROM), a flexible disk (FD), a compact disk recordable (CD-R), or a digital versatile disk (DVD).

Furthermore, the computer programs can be stored in a computer connected over a network such as the Internet such that they can be downloaded as per requirement. Moreover, the computer programs can be distributed over a network such as the Internet.

The computer programs (e.g., control software) executed in the image processing apparatus (or an image forming apparatus) includes modules for each of the abovementioned constituent elements. In practice, the controller CPU 5 reads control programs from a storage medium such as the ROM 6 and executes the same such that the modules for each of the abovementioned constituent elements are loaded and generated in a main storage unit (e.g., the RAM 7).

In this way, according to an aspect of the present invention, an image processing apparatus (image forming apparatus) can be provided that is equipped with functions to fulfill the differing requirements of more than one user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A controller unit that executes, by using an image processing unit selected from a first image processing unit and a second image processing unit, an image processing operation of an image processing apparatus that includes a scanner unit configured to acquire image data by scanning an original, the controller unit comprising:
   a scanning characteristic correcting unit configured to convert the image data into normalized image data;
   an attaching unit to which a controller image processing unit can be detachably attached as the first image processing unit, the controller image processing unit configured to perform a first image processing operation on the normalized image data when attached to the attaching unit; and
   a basic image processing unit configured to function as the second image processing unit and that, when the controller image processing unit is not attached to the attaching unit, configured to perform a second image processing operation on the normalized image data as a substitute for the first image processing operation.

2. The controller unit according to claim 1, further comprising:
   a third image processing unit configured to perform one or more of a plurality of third image processing operations on the normalized image data and output processed image data corresponding to each of the third image processing operation performed on the normalized image data; and
   a data selecting unit configured to select one or more of the processed image data output from the third image processing unit, wherein
   the basic image processing unit is configured to perform reducing operation as the second image processing operation on the processed image data selected by the data selecting unit thereby generating reduced image data.

3. The controller unit according to claim 2, wherein
   the controller image processing unit detachably attachable to the attaching unit includes a memory control unit configured to store the normalized image data in a memory unit as stored image data, and, when the controller image processing unit is attached to the attaching unit,
   the controller image processing unit is configured to perform reducing operation as the first image processing operation on either one of the normalized image data and the stored image data thereby generating reduced image data, and
   the basic image processing unit is configured to refrain from performing the reducing operation on the processed image data selected by the data selecting unit.

4. The controller unit according to claim 3, wherein the controller image processing unit is configured to perform first reducing operation based on a first reducing condition on the normalized image data and then perform second reducing operation based on a second reducing condition different from the first reducing condition on the stored image data.

5. The controller unit according to claim 3, wherein the controller image processing unit is configured to receive line sequential RGB image data as the normalized image data and to output pixel sequential RGB image data.

6. The controller unit according to claim 2, wherein the basic image processing unit is configured to receive any one of line sequential RGB image data and line sequential CMYK image data as the normalized image data and to output pixel sequential image data.

7. The controller unit according to claim 2, wherein the basic image processing unit is configured to perform the second image processing operation in less number of processing steps than the first image processing operation.

8. The controller unit according to claim 1, further comprising a determining unit that, when the controller image processing unit is attached to the attaching unit, is configured to read controller identification information that is identification information of the controller image processing unit from the controller image processing unit and, based on whether the controller identification information is read, is configured to determine whether the controller image processing unit is attached to the attaching unit.

9. The controller unit according to claim 1, wherein, when the control image processing unit is not attached to the attaching unit, the basic image processing unit is configured to generate color image data and monochromatic image data from the normalized image data, the controller unit further comprising:
   a color determining unit configured to determine whether the normalized image data is color image data or monochromatic image data and accordingly output a determination result; and
   a processing unit that, based on the determination result output by the color determining unit, is configured to perform processing on either one of the color image data and the monochromatic image data generated by the basic image processing unit.

10. The controller unit according to claim 9, wherein the controller image processing unit attached to the attaching unit includes a memory control unit configured to store the normalized image data into a memory unit as stored image data and, based on the color determination result output by the color determining unit, configured to convert the stored image data into either one of color image data and monochromatic image data as the first image processing operation.

11. The controller unit according to claim 10, further comprising a communication unit configured to transfer image data to an external apparatus, wherein
   if the communication unit is to transfer the image data to the external apparatus, the basic image processing unit is configured to generate RGB color image data and the monochromatic image data.

12. The controller unit according to claim 9, wherein the second image processing operation performed by the basic image processing unit is less complicated than the first image processing operation performed by the controller image processing unit.

13. A control method performed by a controller unit that executes, by using an image processing unit selected from a first image processing unit and a second image processing unit, image processing operation of an image processing apparatus that includes a scanner unit configured to acquire image data by scanning an original, the controller unit including an attaching unit to which a controller image processing unit is detachably attached to perform a first image processing operation on the image data read by the scanner unit, the control method comprising:
   converting the image data into normalized image data by a scanner image processing unit; and
   performing a second image processing operation, when the controller image processing unit is not attached to the attaching unit, on the normalized image data by a basic image processing unit as a substitute for the first image processing operation.

14. The control method according to claim 13, further comprising:

performing one or more of a plurality of third image processing operations on the normalized image data and outputting processed image data corresponding to each of the third image processing operation performed on the normalized image data by a third image processing unit; and selecting one or more of the processed image data output from the third image processing unit by a data selecting unit, wherein the performing the second image processing operation includes the basic image processing unit performing reducing operation as the second image processing operation on the processed image data selected at the selecting by the data selecting unit thereby generating reduced image data.

15. The control method according to claim 13, wherein, when the control image processing unit is not attached to the attaching unit, the performing the second image processing operation includes the basic image processing unit generating color image data and monochromatic image data from the normalized image data, the control method further comprising:

determining whether the normalized image data is color image data or monochromatic image data and accordingly outputting a determination result by a color determining unit; and performing processing on either one of the color image data and the monochromatic image data generated by the basic image processing unit, based on the determination result output by the color determining unit, by a processing unit.

16. A controller unit that executes, by using an image processing unit selected from a first image processing unit and a second image processing unit, an image processing operation of an image processing apparatus that includes a scanner unit configured to acquire image data by scanning an original, the controller unit comprising:

a correcting means for converting the image data into normalized image data;

an attaching means for attaching a controller image processing unit in a detachable manner as the first image processing unit, the controller image processing unit when attached to the attaching means perform a first image processing operation on the normalized image data; and a processing means for functioning as the second image processing unit and that, when the controller image processing unit is not attached to the attaching means, performs a second image processing operation on the normalized image data as a substitute for the first image processing operation.

* * * * *